US008495036B2

(12) United States Patent
Calder et al.

(10) Patent No.: US 8,495,036 B2
(45) Date of Patent: Jul. 23, 2013

(54) BLOB MANIPULATION IN AN INTEGRATED STRUCTURED STORAGE SYSTEM

(75) Inventors: Bradley Gene Calder, Bellevue, WA (US); Ju Wang, Redmond, WA (US); Xinran Wu, Seattle, WA (US); Niranjan Nilakantan, Redmond, WA (US); Deepali Bhardwaj, Snohomish, WA (US); Shashwat Srivastav, Seattle, WA (US); Alexander Felsöbüki Nagy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 12/257,786

(22) Filed: Oct. 24, 2008

(65) Prior Publication Data

US 2010/0106734 A1    Apr. 29, 2010

(51) Int. Cl.
 *G06F 7/00* (2006.01)
 *G06F 17/00* (2006.01)

(52) U.S. Cl.
 USPC ............................ 707/696; 707/758; 707/791

(58) Field of Classification Search
 USPC ......................................... 707/696, 758, 791
 See application file for complete search history.

(56) References Cited

U.S. PATENT DOCUMENTS

| | | | |
|---|---|---|---|
| 5,515,531 A | 5/1996 | Fujiwara et al. | |
| 5,678,046 A | 10/1997 | Cahill et al. | |
| 5,999,943 A * | 12/1999 | Nori et al. | 707/999.104 |
| 6,061,690 A * | 5/2000 | Nori et al. | 707/999.004 |
| 6,119,123 A | 9/2000 | Elenbaas et al. | |
| 6,275,831 B1 * | 8/2001 | Bodnar et al. | 709/220 |
| 6,484,161 B1 * | 11/2002 | Chipalkatti et al. | 707/999.004 |
| 6,523,036 B1 | 2/2003 | Hickman et al. | |
| 6,615,219 B1 | 9/2003 | Bruso et al. | |
| 6,643,640 B1 * | 11/2003 | Getchius et al. | 707/719 |
| 7,082,455 B2 | 7/2006 | Hu et al. | |
| 7,199,725 B2 * | 4/2007 | Gilfix et al. | 340/4.14 |
| 7,558,859 B2 | 7/2009 | Kasiolas | |
| 8,239,479 B2 * | 8/2012 | Sagar et al. | 709/217 |
| 2004/0212639 A1 | 10/2004 | Smoot | |
| 2004/0215724 A1 | 10/2004 | Smoot | |
| 2005/0099318 A1 * | 5/2005 | Gilfix et al. | 340/825.19 |
| 2005/0125411 A1 | 6/2005 | Kilian | |

(Continued)

OTHER PUBLICATIONS

Office Action mailed Feb. 3, 2011 in U.S. Appl. No. 12/257,747.

(Continued)

*Primary Examiner* — Phong Nguyen
(74) *Attorney, Agent, or Firm* — Shook Hardy & Bacon LLP

(57) ABSTRACT

Embodiments of the present invention relate to systems, methods and computer storage media for facilitating the structured storage of binary large objects (Blobs) to be accessed by an application program being executed by a computing device. Generally, the manipulation of Blobs in a structured storage system includes receiving a request for a Blob, which may be located by way of a Blob pointer. The Blob pointer allows for the data, such as properties, of the Blob to be identified and located. Expired properties are garbage collected as a manipulation of the Blob data within a structured storage system. In an embodiment, the Blob is identified by a key that is utilized within a primary structured index to located the requested Blob. In another embodiment, the requested Blob is located utilizing a secondary hash index. In an additional embodiment, the Blob is locate utilizing a file table.

13 Claims, 11 Drawing Sheets

U.S. PATENT DOCUMENTS

| | | | |
|---|---|---|---|
| 2005/0183082 A1* | 8/2005 | Lewites et al. | 718/1 |
| 2006/0031268 A1 | 2/2006 | Shutt | |
| 2006/0155781 A1 | 7/2006 | MacCormick | |
| 2006/0282457 A1 | 12/2006 | Williams | |
| 2006/0282481 A1 | 12/2006 | Zhou | |
| 2007/0030853 A1 | 2/2007 | Rogers | |
| 2007/0050399 A1 | 3/2007 | George | |
| 2007/0282806 A1 | 12/2007 | Hoffman | |
| 2008/0021865 A1 | 1/2008 | Corkill et al. | |
| 2008/0195668 A1 | 9/2008 | Galindo-Legaria | |
| 2008/0243945 A1* | 10/2008 | Hanus et al. | 707/202 |
| 2008/0313496 A1 | 12/2008 | Prabhakaran | |
| 2008/0317068 A1* | 12/2008 | Sagar et al. | 370/503 |
| 2010/0106695 A1 | 4/2010 | Calder | |
| 2010/0205157 A1* | 8/2010 | Hanus et al. | 707/690 |

OTHER PUBLICATIONS

U.S. Appl. No. 10/219,106, filed Aug. 15, 2002.
U.S. Appl. No. 10/606,626, filed Jun. 25, 2003.
U.S. Appl. 12/257,747, filed Oct. 24, 2008.
DB2 goes Hybrid: Integrating Native XML and XQuery with Relational Data and SQL, http://www-tr.watson.ibm.com/journal/sj/452/beyer.pdf, Date: 2006.
Ghemawat et al., The Google File System, http://www.cs.cornell.edu/Courses/cs614/2004sp/papers/gfs.pdf, Date: 2003.
Right Scale Blog, Why Amazon's Elastic Block Store Matters, http://blog.rightscale.com/2008/08/20/why-amason-ebs-matters/, Aug. 20, 2008.
Amazon EBS—Elastic Block Store has launched—All Things Distributed, httb://www.allthingsdistributed.com/2008/08/amazon_ebs_elastic_block_store.html, Aug. 28, 2008.
Chang et al., Bigtable: A Distributed Storage System for Structured Data, labs.google.com/papers/bigtable-osdi06.pdf, Date: 2006.
Embedded Predictive Modeling in a Parallel Relational Database, http://researchweb.watson.ibm.com/dar/papers/pdf/sac_2006_final.pdf, Date: 2006.
Final Office Action in U.S. Appl. No. 12/257,747 mailed Aug. 17, 2011, 12 pages.
Non-Final Office Action in U.S. App. No. 12/257,747 mailed Mar. 6, 2012, 21 pages.

* cited by examiner

| NAME 1 | DESCRIPTION 1 | PRICE 1 | PICTURE A1 | PICTURE B1 |
| NAME 2 | DESCRIPTION 2 | PRICE 2 | PICTURE A2 | PICTURE B2 |
| ... | ... | ... | ... | ... |
| NAME N | DESCRIPTION N | PRICE N | PICTURE AN | PICTURE BN |
| 1002 | 1004 | 1006 | 1008 | 1010 |

*FIG. 10.*

BLOB MANIPULATION IN AN INTEGRATED STRUCTURED STORAGE SYSTEM

CROSS-REFERENCE TO RELATED APPLICATIONS

This application is related to subject matter to the invention disclosed in the following U.S. patent application filed on even date herewith, U.S. application Ser. No. 12/257,747, entitled "Scalable Blob storage integrated with scalable structured storage," which is assigned or under obligation of assignment to the same entity of this application, and incorporated in this application by reference.

BACKGROUND

Traditionally, structured storage systems achieved efficiency and desired characteristics by maintaining a structured system that includes constraints on the information or data maintained within the structured storage system. When the constraints, such as constraints on the size or character of the data, are relaxed or eliminated, the structured storage system will not perform as well as originally intended. Binary Large Objects (Blobs) are a collection of bits stored in a data management system. Blobs are typically varied in size and character. Blobs are therefore difficult to integrate into a structured storage system because of their varied size and character.

SUMMARY

Embodiments of the present invention relate to systems, methods and computer storage media for facilitating seamless integration and access of binary large objects (Blobs) with structured storage by an application program being executed by a computing device. In particular, the manipulation of Blobs in a structured storage system includes receiving a request for a Blob, which may be located by way of a Blob pointer. The Blob pointer allows for the data, such as properties, of the Blob to be identified and located. Expired properties are garbage collected as a manipulation of the Blob data within a structured storage system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Illustrative embodiments of the present invention are described in detail below with reference to the attached drawing figures, which are incorporated by reference herein and wherein:

FIG. 10 depicts a table representing an exemplary circumstance that combines structured storage data and Blob data, in accordance with an embodiment of the present invention;

DETAILED DESCRIPTION

Figure 1:
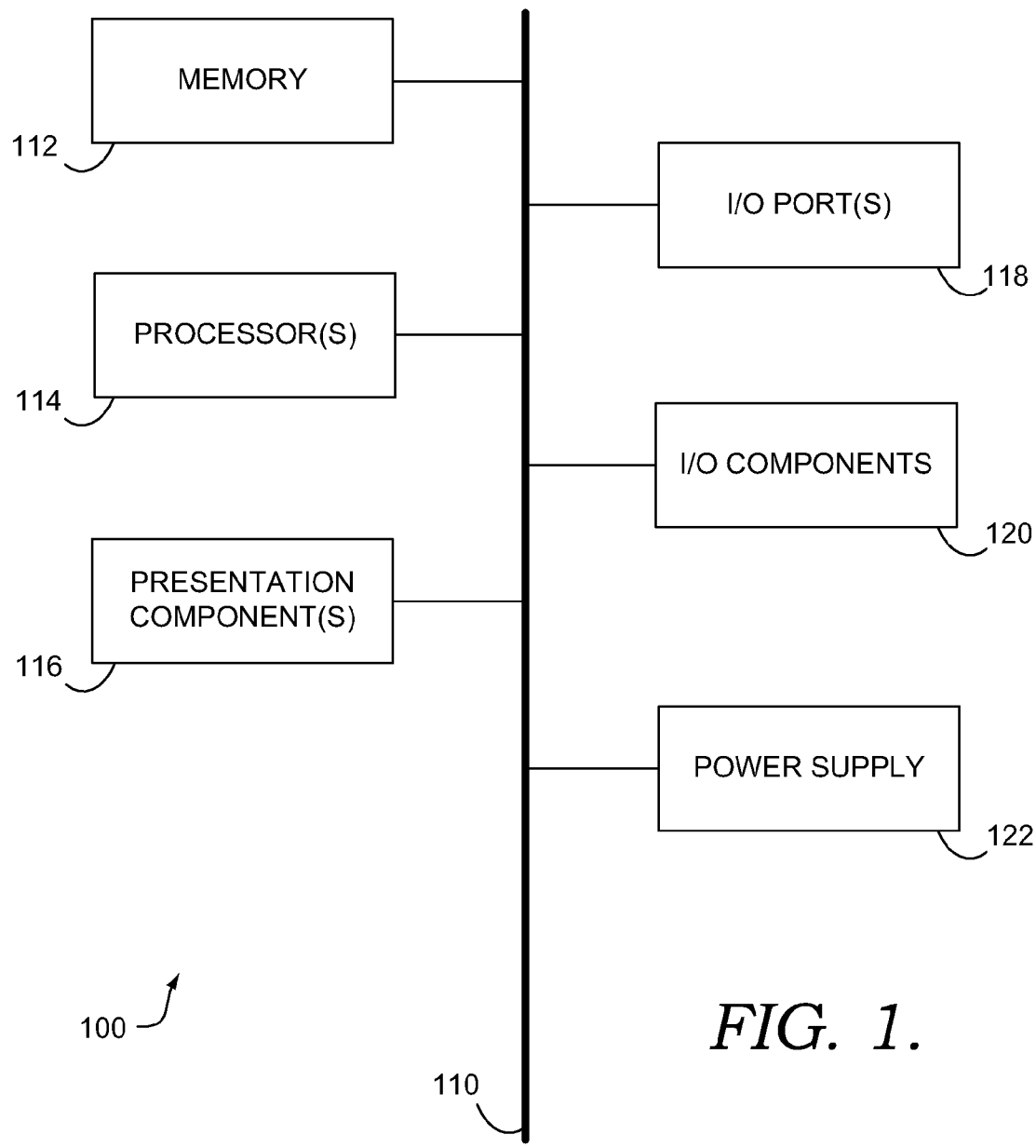
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods and computer storage media for facilitating seamless integration and access of binary large objects (Blobs) with structured storage by an application program being executed by a computing device. In particular, the manipulation of Blobs in a structured storage system includes receiving a request for a Blob, which may be located by way of a Blob pointer. The Blob pointer allows for the data, such as properties, of the Blob to be identified and located. Expired properties are garbage collected as a manipulation of the Blob data within a structured storage system.

Accordingly, in one aspect, the present invention provides a computer storage media having computer-executable instructions embodied thereon for performing a method for retrieving data of a Binary Large Object (Blob) in a structured storage system. The method includes receiving a request for a Blob from an application program. The method also includes identifying a Blob pointer associated with the Blob. The method also includes identifying data associated with the Blob. The data is identified, in part, by the Blob pointer. Additionally the method includes communicating the data to the application.

In another aspect, the present invention provides computer storage media having computer-executable instructions embodied thereon for performing a method of garbage collection in a structured storage system. The method includes identifying one or more expired properties in a primary structured index, wherein data associated with the one or more expired properties is stored in one or more extents of a stream. The method also includes identifying the one or more extents of the stream associated with the expired properties. The method additionally includes determining at least one of the one or more extents is to be collected. The method further includes reclaiming the at least one extent from the stream. The method also includes checkpointing a list of extents reclaimed.

A third aspect of the present invention provides computer storage media having computer-executable instructions embodied thereon for performing a method for retrieving data of a Binary Large Object (Blob) in a structured storage system. the method includes receiving a request for a Blob from an application, wherein the Blob is accessible by way of a primary structured index of the structured storage system. The method also includes identifying a key to a property that includes a Blob pointer associated with the Blob, wherein the key includes a reference to a particular row of the primary index as well as a reference to the property. The method also includes determining that the Blob pointer is unavailable in the primary structured index. The method additionally includes locating the Blob pointer in a secondary hash index, wherein the Blob pointer is located utilizing the key. The method also includes utilizing the Blob pointer to identify a Committed Block List (CBL) that identifies one or more blocks of a Blob data stream. The method also includes reading data from at least one of the one or more blocks identified in the CBL. The method additionally includes communicating the data to the application.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
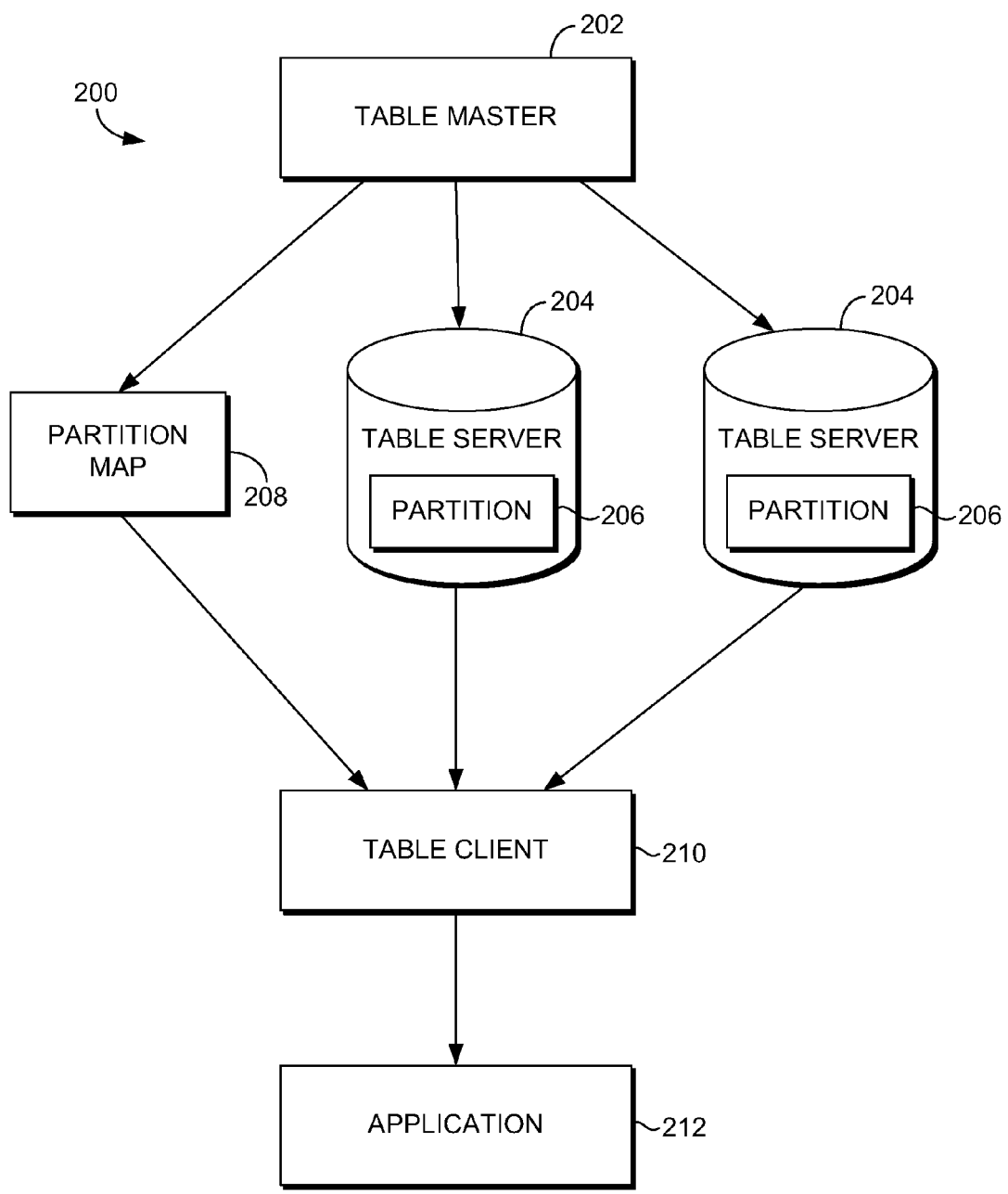
FIG. 2 depicts a block diagram illustrating an exemplary system in which embodiments of the present invention may be employed.

With reference to FIG. 2, a block diagram is provided illustrating an exemplary system 200 in which embodiments of the present invention may be employed. It should be understood that this and other arrangements described herein are set forth only as examples. Other arrangements and elements (e.g., machines, servers, tables, indexes, clients, interfaces, functions, orders, and grouping of elements, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a table master 202, one or more table servers 204, one or more partitions 206, a partition map 208, a table client 210, and an application 212. Each of the elements shown in FIG. 2 may be any type of computing device or implemented by a computing device, such as computing device 100 described with reference to FIG. 1, for example. The components may communicate with each other via a bus or a network, which may include, without limitation, one or more local area networks (LANs) and/or wide area networks (WANs). Such networking environments are commonplace in offices, enterprise-wide computer networks, intranets, and the Internet.

The system 200, in an exemplary embodiment, is functional to provide scalable, available, and durable Binary Large Object (a "Blob" also referred to herein as a "Blob") storage in a structured storage environment. A Blob is a collection of binary data stored as a single entity. As a matter of example, Blobs may be images, audio, records, text, or other multimedia objects. Blobs can also be executable code or other collections of binary data.

Providing a one-lookup Blob access and Blob access that is integrated into a structured storage system are desirable aspects that the system 200 facilitates. A one-lookup Blob access is a single Input Output (I/O) read activity from memory. In an exemplary embodiment, a one-lookup Blob access includes accessing an in-memory hash table that provides a pointer to a Blob store. Traditionally, structured storage would require at least two I/Os (two lookups) to achieve the same result (one read to get the index and one read to get the blob). For example, the application 212 may only desire to retrieve Blobs by their names, therefore an efficient access to the Blobs is provided by the system 200. The system 200 is capable of providing one-lookup Blob access by allowing an efficient single hash value lookup of the Blobs. The single hash value, in an exemplary embodiment, is a hash of one to many keys of the structured storage system. In an exemplary embodiment, the single hash lookup is a function of a secondary hash index that maintains a hash in memory, as discussed later. In an exemplary embodiment, the secondary hash index is in memory and maintains a mapping between one or more keys and corresponding Blobs. Additionally, the system 200 is capable of providing one-lookup Blob access and providing an efficient query of the Blob namespace. For example, the Blob namespace is searchable in an alphanumeric manner, which will also be discussed later. These two functionalities are typically mutually independent of one another, but the system 200, in an exemplary embodiment, is able to provide both functionalities, which allows for a one-lookup access for an application, such as the application 212. Further, the application 212, in another embodiment, is able to retrieve metadata information about a Blob and query the metadata, utilizing the system 200.

Providing a one-write Blob access and Blob access that is integrated into a structured storage system are desirable aspects that the system 200 facilitates. A one-write Blob access is a single Input Output (I/O) when storing a blob before returning success back to the client. In an exemplary embodiment, a one-write Blob access includes updating an in-memory primary index and then writing the Blob plus the row command to the Blob log in a single write to commit the transaction. In typical systems, this would require two writes, one to write the Blob, and one to write the row command to the row log. An exemplary embodiment of the present invention allows for committing the blob back to the client 210 and application 212 in a single write I/O, instead of two writes, as is traditionally done.

Further, as previously mentioned, Blob access that is integrated into a structured storage system is desirable functionality provided by the system 200 in an exemplary embodiment. Typically, an application, such as application 212, desires to store objects in a structured storage system to facilitate querying over the stored data. Additionally, the application may desire to store Blobs in a structured storage system to provide efficient access to the Blobs. The query performance of the structured storage system should not be sacrificed due to storage of the Blobs. In an exemplary embodiment, to prevent the degradation in query performance of a structured storage system that is utilized to store Blobs, the Blobs are treated as an optimization to structured storage. The Blobs, in such embodiments, are part of the structured storage system, but the Blob can be stored inline or out of line with the structured data, which will be described in more detail below. This allows for an efficient and dynamic optimization of how a Blob is stored with respect to a structured storage system.

In order to achieve the functionality of one-lookup Blob access, one-write Blob updates, and Blob access integrated into a structured storage, the Blob storage is integrated into a scalable structured storage system and a scalable stream storage system, in an exemplary embodiment. Various architectural layers are utilized to achieve this functionality. For example, a stream layer, a structured storage layer, a Blob storage integrated as part of the structured storage layer, and a scalable stand-alone Blob store layer are all layers that facilitate one-lookup access, one-write Blob updates, and Blob access integrated into a structured storage.

An exemplary stream layer provides the data replication and data fault tolerance for a storage system. It provides a file system type interface that allows large streams of data to be persistently stored, which is also available and durable. The interface provides the ability to Open, Close, Append, and Read data, such as blocks, from the stream. The stream sizes can range from a few bytes to petabytes in size. This provides dynamic replication of data, with 'N' copies of the data being stored, where 'N' represents the number of copies. Therefore, if a node of the system, such as a table server fails or bit-rot is detected, data is dynamically re-replicated to get back to 'N' copies. This reduces the probability of losing data. In this exemplary embodiment, the Stream Layer is used by the Structured Storage Layer and Blob Layer to persistently store all of their data into streams.

Further, in an exemplary stream layer, the stream layer provides the capability of efficiently hard linking a region of the stream into another stream. In this example, each stream at the stream layer is composed of a list of data blocks, called extents. The data in the stream is stored inside the extents. For this example, a stream is an ordered list of extents. A particular extent can reside in multiple streams, or even appear multiple times in the ordered extent list of the same stream. The stream layer, in this example, provides an interface to compose a stream by linking a set of existing extents, which reside in another stream. This example allows for no real data copy to be involved in this process, which provides efficiency. The stream layer also maintains the reference count of each extent, in this example. In an example, once an extent lacks a stream pointing to it, the extent in the stream layer is garbage collect (deleted) from the system.

The stream layer, in an additional embodiment, also supports the ability to have multiple stream level operations, such as creation, deletion, renaming of streams, and hard-linking extents to a stream, in one atomic transaction.

Both the Blob storage and the structured storage make extensive use of these features to efficiently garbage collect the obsolete portion of the streams of a partition, in an exemplary embodiment. For example, the Blob garbage collector reclaims the space used by dead Blobs, which are no longer referenced by a primary index. These features are used to efficiently reclaim the unused space in an append-only storage media. This is accomplished by creating a new Blob data stream to hold the Blob data that is still referenced. Then, in this example, atomically hard linking the extents that are still in use from the Blob data stream to the new Blob data stream, thereby allowing for the deletion of the original stream and renaming the new Blob data stream to the old Blob data stream name. All these are done in one atomic transaction in this embodiment. Additionally, this increases efficiencies by not copying data or moving data around on a disk. In addition to efficiencies gained, this also significantly simplifies failure-handling logic.

An exemplary structured storage layer provides scalable access to structured storage in the form of Tables, Rows/Entities and Properties. Tables are partitioned across nodes for scalability. Stored data objects are rows/entities of column/property values. Typically, the data has a set of properties that together are defined as a partition key. In an embodiment, the partition key is used to group all of the entities into a partition. A partition, in this example, includes all entities with the same partition key value. Additionally, in this example, there is a set of properties that form a row key. Together, in this example, the partition key plus the row key represent the primary key, and the data is stored by partition key and then row key. The data, in this example, is stored sorted by this primary key. In an additional embodiment, the data is stored for efficient sequential access (scans) in an index for efficient random access. In yet another example, the partition key is the exact property key values supplied by an application. This allows for efficient scanning over the whole table and all of the entities sorted based on the property values of the partition key. In further examples, the first part of the partition key is a hash value of some (or all) of the partition key property values. This is useful to randomly distribute the partitions across the table. The advantage of this is more random distributed load, at the tradeoff of not being able to as efficiently-sequentially scan over all partitions sorted by the original partition key property values.

An exemplary Blob storage integrated as part of structured storage layer achieves the second desired functionality previously discussed, the Blob storage layer is integrated into and is part of the structured storage layer. A Blob is handled the same as any other property in the structured storage system. In an embodiment, one difference between other properties and Blobs is that the Blob property is stored separately from the row data, with a pointer from the row property representing the Blob to the raw data. This is an example of storing the Blob data and the row data separately. In this example, the Blob storage is actually just part of structured storage, but the Blob data is optimized out of the common row operations of the structured storage for efficient querying and access.

An exemplary scalable stand-alone Blob store achieves the first two desired function previously described, which is one-lookup Blob read and one-write Blobs. The scalable stand-alone Blob store utilizes the three previously discussed layers (i.e., stream layer, structured storage layer, and Blob layer) to provide a client library that provides access to a Blob and block data model and a related API. In this example, to maintain the Blob namespace, a Blob table is created in the structured storage layer. The Blob name is set as one of the primary keys for the Blob table. Additional properties are included with the row/entity of the Blob table, which includes a metadata property and a Blob property among others. Since the Blob table is built on the scalable structured storage system, it is automatically partitioned, scaled and load balanced to meet the traffic needs of the Blob storage system. The metadata property, in an exemplary embodiment may include a last modified time, a creation time, an expiry time and a version. In an exemplary embodiment, a related Blob client library executes structured table commands because the Blob storage system is an integrated part of the structured storage system.

Returning to FIG. 2, the system 200 depicts an exemplary table layer architecture for performing aspects in accordance with embodiments of the present invention. For example, the table layer includes a set of table servers 204 to store and provide access to a structured storage system. Additionally, the table layer manages the table servers 204 by way of, the table master 202. Further, the table client 210 provides applications, such as application 212, access to the structured storage system.

An exemplary table master, such as table master 202, is responsible for assigning partitions, such as partitions 206 to table servers, such as table servers 204. In addition, the table master can be responsible for quickly determining when a partition is not served due to a failure and reassigning the partition to a different table server. Additionally, the table master can be responsible for controlling the load balancing of partitions among table servers, and monitoring the health of the table servers.

An exemplary table server, such as table servers 204, is responsible for providing read and write access to the partitions assigned to the table server. For example, the table servers 204 are responsible for providing read and write access to their respective partitions 206. In an embodiment, a table server can host a number of partitions ranging from zero to many.

An exemplary table client, such as the table client 210, is linked to an application, such as application 212, and is used to issue commands to the partitions. For example, when application 212 attempts to read a partition, such as partition 206, the table client 210 issues commands to the table server 204 to access the partition 206. The table client uses a partition map, such as the partition map 208, to determine which table server is responsible for serving a particular partition. This allows the table client to send commands to the table server serving the desired partition. The table client also receives the results back from the table server and passes the results on to the requesting application. In an exemplary embodiment, the partition map is a special table, which stores the mapping between partitions and table servers serving the partitions. Typically, the partition map is maintained by the table master.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting.

Figure 3:
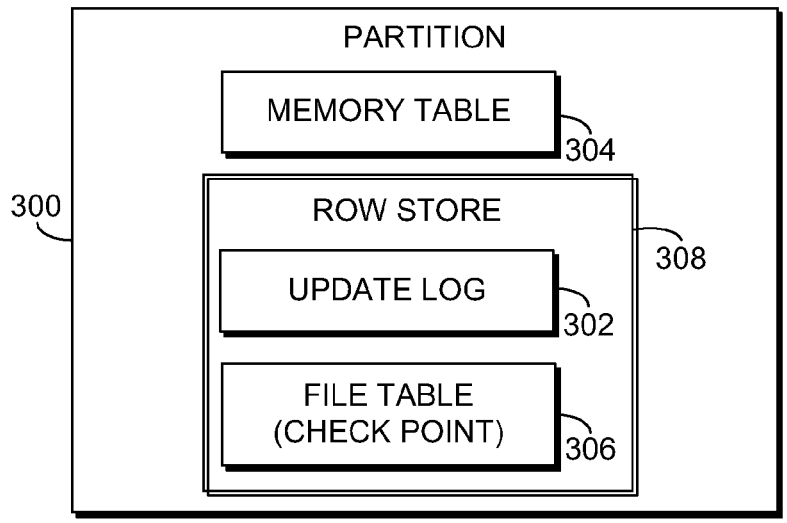
FIG. 3 depicts a block diagram illustrating an exemplary partition suitable for embodiments of the present invention.

Turning to FIG. 3, a block diagram is provided illustrating an exemplary partition 300 suitable for embodiments of the present invention. In an exemplary embodiment, the partition 300 visually depicts the partitions 206 previously discussed with respect to FIG. 2. The partition 300 is comprised of an update log stream 302, a memory table 304, a row store 308, and a checkpoint stream 306. An update log, such as the update log stream 302, typically keeps track of recent changes to the partition. Generally, the update log maintains these changes in persistent storage. A memory table, such as the memory table 304, is an in-memory version of recent updates in the update log of the partition. Typically, the memory table includes the recent delta changes to the partition. A file table, such as the checkpoint stream 306, is a checkpointed version of a memory table. For example, when a memory table exceeds a predetermined size or when a predetermined number of changes are recorded in the memory table, the memory table is checkpointed to a file table, which is persisted storage. When a memory table is checkpointed to a file table, all of the requests in an update log, up to the checkpointed memory table, may be removed from the update log. Therefore, when a partition is accessed from a table server, in an embodiment, the table server will first look to identify a matched row in a memory table, which will indicate all of the recent changes associated with that matched row. When there is not a match in the memory table, the table server then queries a page cache followed by the file tables for the data in this embodiment. It is understood that the query could be done in any order from any source of the data provided herein.

In an exemplary embodiment, a partition includes multiple file tables in a checkpoint stream 306. This typically occurs when a memory table is dumped, which results in a file table checkpoint for the partition. Further, in this embodiment, multiple memory tables are in the partition. For example, when a memory table to preparing to be checkpointed, the memory table cannot accept new updates, therefore a new memory table is created for any new updates to the partition. As a result, a second memory table is associated with the partition. In this example, the memory tables are searched from newest to oldest or oldest to newest.

In an exemplary embodiment, a table server that includes support for Blobs includes three components: a command processor, a row data access component, and a Blob data access component. A command processor, in an exemplary embodiment, handles client table requests and translates them into corresponding calls to the partition at the table server. The command processor then performs operations over rows of the partition manipulating both row and Blob data as appropriate. A row data access component provides management of the row data access within a structured store. The Blob data access provides management of the Blob data within a Blob store. In an exemplary embodiment, Blob data includes Blob data bits, metadata, system information, and other data useable for seamless integration of Blobs with structured storage. For integrating Blob support into a structured store, some Blob data is stored as part of a row. Additionally, the Blob data and metadata may be stored separately from the row data. In an embodiment, the Blob data is stored in the same logs and checkpoints as typical row data, but in different structures. In an additional exemplary embodiment, the Blob data is stored in separate logs and checkpoints from the row data. This allows for compaction/merging of the row checkpoints without having to recopy Blob data, and it allows for a single-write Blob insert/update. As previously mentioned, the Blob data is typically large, therefore, abstaining from the recopying of Blob data provides efficiencies. By storing the Blob data in different logs and checkpoints, the expense of recopying the data can be minimized because Blob data can be large (relative to traditional row data) and, generally, Blob data is rarely changed/updated. Additionally, the separate logs and checkpoints can be stored in the same file or stream, or in the alternative, the Blob data can be stored in a separate stream from the row data.

Figure 4:
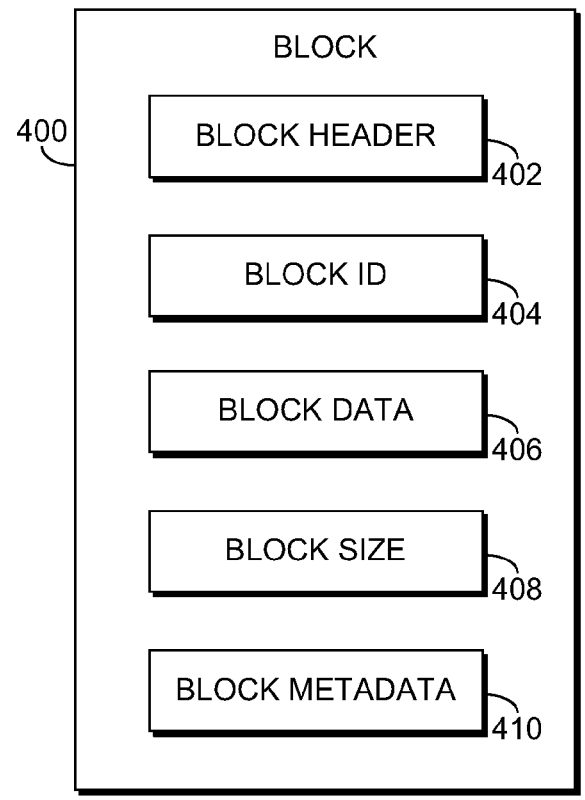
FIG. 4 depicts a block diagram illustrating an exemplary block in accordance with an embodiment of the present invention.

Turning to FIG. 4, a block diagram is provided illustrating an exemplary block 400 suitable for embodiments of the present invention. In an exemplary embodiment, a Blob is represented as a list of blocks. Typically, a block is comprised of a block header 402, a block ID 404, and block data 406. A block may also include a block size 408 and block metadata 410. In addition to those elements listed, a block may include any number of additional elements. A block header can contain metadata for the block, data length, hash function of the block (such as a Message Digest algorithm 5 (MD5)), and a hash value for the block (and/or the block header). A block ID is a unique identifier of the block. The block ID may be stored as part of the block or it may be stored apart from the block. For example, the block ID for a particular block may be stored with a block list (such as a TBL or CBL to be discussed later) instead of being stored with the actual block. Block data includes the actual data bytes stored for the block. A block size includes an indication as to the size of the block. Block metadata, similar to the metadata discussed with respect to the block header, includes data of the block.

Figure 5:
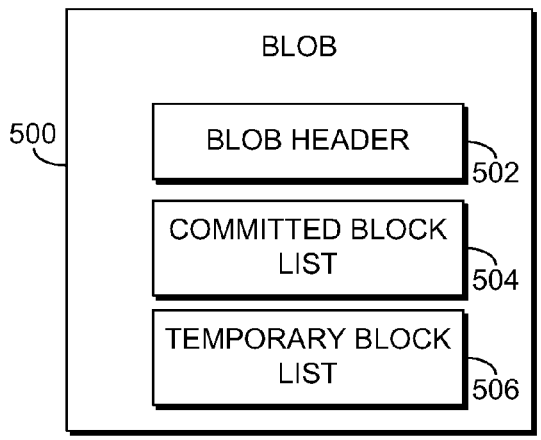
FIG. 5 depicts a block diagram illustrating an exemplary Blob structure in accordance with an embodiment of the present invention.

Turning to FIG. 5, a block diagram is provided illustrating an exemplary Blob structure 500 suitable for embodiments of the present invention. The Blob structure 500 includes a Blob header 502, a committed block list 504, and a temporary block list 506. In some embodiments, a TBL is not stored inside a Blob header. Additionally, in some embodiment an address (pointer) is stored in a primary structured table. In yet an additional embodiment, an address of the TBL is stored in a Blob header. Typically, a Blob header is an aggregate structure that includes a key for the Blob that maps it back to the Blob property in the structured store. In an embodiment, the Blob header is the element that a Blob property in the structured store may point to. For example, in a primary structured table (to be discussed later), a pointer that identifies the Blob referenced by the row in which the pointer is found, is pointed to the Blob header of the Blob. In some embodiments, a Blob header includes additional information of a Blob, such as an MD5 of the Blob, size of the Blob, or other metadata of the Blob.

Figure 6:
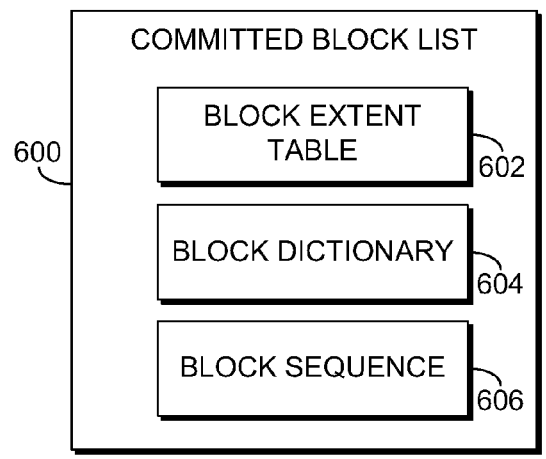
FIG. 6 depicts a block diagram illustrating an exemplary committed block list (CBL) in accordance with an embodiment of the present invention.

Turning to FIG. 6, a block diagram is provided illustrating an exemplary committed block list (CBL) 600 suitable for embodiments of the present invention. A CBL typically includes a block extent table, such as a block extent table 602, a block dictionary, such as a block dictionary 604, and a block sequence, such as a block sequence 606. A CBL identifies a set of blocks that define a committed view of the Blob. A block extent table is a list of extents/offsets referenced by the block list. Each block record is encoded with an index into this table. The block extent table is used by a block dictionary to store block offsets in a compact form. In an exemplary embodiment, the blocks stored in the extent are in the same order as they are specified in the Block sequence. Storing blocks in the same order as in block sequence can, in an embodiment, improve sequential scanning/streaming of Blob data. The Blob system attempts to optimize this data layout to speed up the sequential scanning of Blob data when possible. In an exemplary embodiment, the block sequence is stored as a "B-tree" structure to improve random access of the blocks. Further, in another embodiment, both a sequential list and a B-tree structure are utilized for the storage. A block dictionary is a list of block records that are sorted by their respective block ID. A block sequence is a listing of blocks that define the actual Blob layout. The block sequence resolves the logic byte position with the Blob, which may be across block boundaries.

Figure 7:
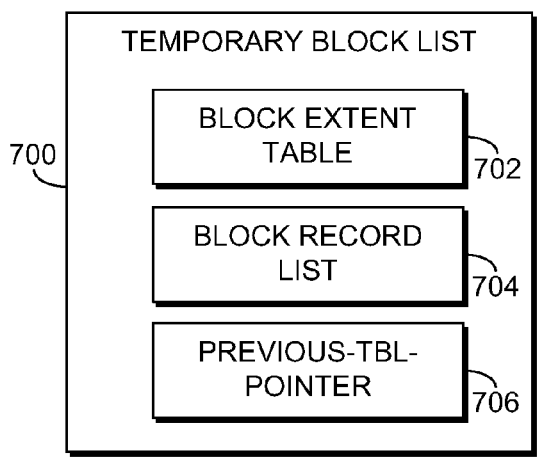
FIG. 7 depicts a block diagram illustrating an exemplary temporary block list (TBL) in accordance with an embodiment of the present invention.

Turning to FIG. 7, a block diagram is provided illustrating an exemplary temporary block list (TBL) 700 suitable for embodiments of the present invention. A TBL is utilized to maintain a list of uncommitted blocks associated with a Blob. A TBL typically includes a block extent table, such as a block extent table 702, a block record list, such as a block record list 704, and a previous TBL pointer, such as a previous TBL pointer 706.

In an exemplary embodiment, a block extent table is a list of extents referenced by the block list. In an exemplary embodiment, each of the blocks included with the list have a block record encoded with an index into this table. In this example, a block record list is a list of blocks ordered by upload sequence from oldest to newest. This simplifies resolving which block is the most recently uploaded block during a commit sequence. Each entry in the list may contain the block ID and the pointer to the data where the corresponding block is stored in a stream. In an exemplary embodiment, the block extent table is used by the block record list to store block offsets in compact form. It is understood that the sequence may be changed to satisfy conditions of the system. An exemplary embodiment includes a previous TBL pointer that points to the previous TBL in an upload sequence. The chaining of TBLs prevents having to traverse every TBL entry when committing a list of blocks to represent a Blob (converting the TBL to a CBL).

Figure 8:
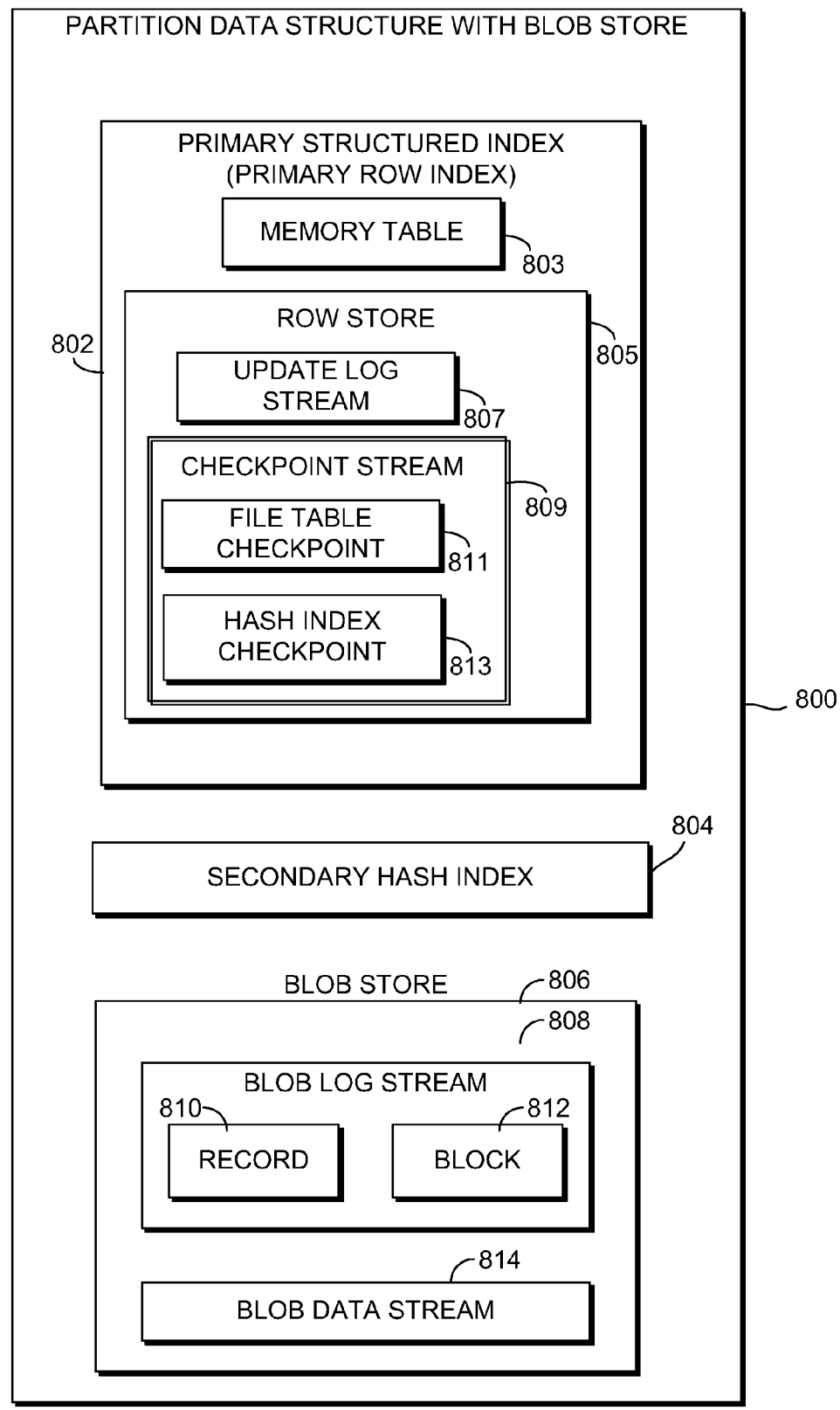
FIG. 8 depicts a block diagram illustrating an exemplary data structure in accordance with an embodiment of the present invention.

Turning now to FIG. 8, a block diagram is provided illustrating an exemplary data structure 800 suitable for embodiments of the present invention. It should be understood that this and other arrangements described herein are set forth only as examples. Other arrangements and elements (e.g., one or more records, blocks, TBLs, CBL, Blob log streams, Blob data streams, etc.) can be used in addition to or instead of those shown, and some elements may be omitted altogether. The exemplary data structure 800 includes a primary structured index 802, a secondary hash index 804, and a Blob store 806. The Blob store 806 includes a Blob log stream 808, which includes a record 810 and a block 812. The Blob store 806 also includes a Blob data stream 814. The primary structured index 802 includes a memory table 803 and a row store 805. The row store 805 includes an update log stream 807 and a checkpoint stream 809. The checkpoint stream 809 includes a file table checkpoint 811 and a hash index checkpoint 813. The primary structured index 802, in an embodiment, includes similar features and elements as previously discussed in FIG. 3.

Traditionally, a primary structured index, such as the primary structured index 802, is part of a standard table in a structured storage system. The primary index, sometimes referred to as a primary structured index, is an index of a partition for indexing one or more Blobs in a structured storage system. The primary structured index includes rows. Each row is typically associated with one or multiple Blobs. In an embodiment, each row is only associated with a single Blob. This is typically true when a partition is focused on providing Blob storage services. In yet another embodiment, each row is a structured object for structured storage where there are many Blob properties (columns) stored with each row.

In an embodiment, each row includes a primary key. The primary key can include a single property or multiple properties to identify a particular row. The primary key, in one embodiment, is a single property in the primary structured index. In an additional embodiment, the primary key includes multiple columns (properties). In addition to a primary key, the primary structured index may include Blob properties. The intersection of a row and a column (property) is defined as a cell. Therefore, in an embodiment, a key value for a particular Blob is located in a cell defined by the row the Blob occupies and the column that identifies key values.

A Blob property of the primary structured index may include a pointer to the Blob associated with a particular cell. For example, the Blob pointer, in an exemplary embodiment, is a reference that allows a Blob header to be located in a structured storage layer or a stream storage layer. Continuing with this example, the Blob pointer allows a Blob header to be located in an appropriate row store or Blob store in a stream storage layer. It is understood that the pointer may indicate a multitude of locations, entities, and addresses. For example, the pointer may be to a particular extent, offset, directory, block, Blob, or entities of those, such as a Block header or a CBL. Additionally, the Blob property may include a pointer to a TBL and/or a CBL. Additionally, the Blob property may include a time the TBL was last modified, a time the Blob was created or last modified. Further, the Blob property may include metadata for the Blobs represented by the rows of the primary structured index. In an exemplary embodiment, a Blob property is considered a dictionary that allows the components of the dictionary to be queried and manipulated by a structured storage system. It is understood that multiple Blobs may be included within a given row of a primary structured index, therefore, while discussed herein is a single Blob property, it is contemplated that multiple Blob properties are associated with a given row.

A secondary hash index, such as the secondary hash index 804, is a secondary hash index of the primary structured index. As a result, in an exemplary embodiment, the secondary hash index provides a compressed secondary hash index for the rows stored in a partition. Traditionally, the secondary hash index cannot be utilized to query or scan over the primary key ranges. However, the secondary hash index traditionally provides an in-memory lookup for a single row or Blob by returning, as a result, a pointer to the full row or Blob stored in persistent storage. The in-memory look-up is available when the secondary hash index is in memory. In an exemplary embodiment, the secondary hash index is utilized to provide an efficient Blob look-up of Blobs in a structured storage system.

The secondary hash index, in an exemplary embodiment representing a Blob index, stores items that are likely to be read when reading the Blob and may need to change often based on certain access patterns (e.g., the last-modified-time is changed every time the Blob property is updated). To the contrary, a Blob header, such as the Blob header 502 of FIG. 5, may contain some items of the Blob property to allow their retrieval along with Blob bits (Blob data) in one I/O when used in combination with the secondary hash index. The Blob header, in an embodiment, stores data items that are likely to be read when reading the Blob and rarely change. A table schema specifies the list of the data items in the Blob property that will be included in the Blob header and the secondary hash index. In an embodiment, all of the Blob data items are also stored in the Blob property of a row, which is treated as authoritative for the values for these data items.

Consistency among memory tables, hash indexes, and file table checkpoints are important for some embodiments. In an exemplary embodiment, a hash index is not required to be consistent with related memory tables and file tables in order for a related partition to be loaded and served. Therefore, in this example, the hash table can be made consistent with memory tables and file tables lazily. Continuing with this example, until the hash index is consistent, the hash index is not utilized. A primary structured index, in this example, is utilized until the hash index is consistent.

Load balancing of partitions, in some embodiments, is critical to serving a partition on one or more additional nodes quickly. In this embodiment, before a partition is served on another node as a result of load balancing, the latest parts of the an associated update log are replayed to get delta changes in a memory table, this places the memory table in a condition similar to that prior to load balancing. Once the memory table is back up, the partition can be served from the node, such as a server. One important optimization of this particular embodiment includes prior to offloading a partition for load balancing, the partition's memory tables are checkpointed in order to reduce the amount of time it takes to replay the update log and/or the Blob log to start serving the partition.

Additionally, in another embodiment, file tables contain checkpoints of one or more partitions' Insert/Update/Delete of row/property data. Over time, these file table checkpoints are merged together for a partition to provide a more efficient lookup. This is done independent or without interference of the processing of the partitions, as a result of a new checkpoint that is written, which allows the partition to continue processing as normal. After a new file table checkpoint is created, extents containing the old file table checkpoints in the stream can be garbage collected (to be discussed later) utilizing a multi modification process.

In embodiments of the present invention, maintaining the consistency of a hash index is important. This is especially in light of failures and load balancing of partitions and nodes. The following is an exemplary description on maintaining consistency with the system. It is understood that additional methodologies are contemplated and the following is not limiting as to the scope of the present invention.

The hash index itself is checkpointed into a stream, such as a file table stream. In this example, the stream will contain checkpoints of (a) file tables and (b) hash indexes. Continuing with the example, the hash index in memory is checkpointed at a similar time with a memory table in order to keep the hash index consistent with the checkpointed row data in the file tables. However, the checkpointing of a hash index can be resource intensive. Therefore, two methods are provided, but it is appreciated that the following are merely exemplary and not limiting as to the scope of the present invention.

1. Because the whole hash index could be recreated from a combination of related file tables and the memory tables for a partition. This allows for the maintaining of the hash index by checkpointing the whole thing, and then applying the recent changes since the last checkpoint. Therefore, when a partition is reloaded, it is only necessary to lazily update the hash index with the file table checkpoints and memory tables that have been created since the last hash index checkpoint.

2. A full hash index checkpoint is performed periodically. When a new memory table is checkpointed, the delta changes to the hash index (since the last memory table checkpoint) are stored into the checkpoint at a similar time the memory table is checkpointed. Then when the partition is loaded, the last hash index checkpoint is loaded along with the deltas since the last full checkpoint. Periodically in this example, a full up-to-date checkpoint of the hash index is completed. Following an up-to-date checkpoint, previous deltas may be ignored as a result of the full up-to-date checkpoint. With this option, when the partition is reloaded the last full hash index checkpoint is read and then updated with relevant deltas.

To determine the consistency of the data in the secondary hash index and the Blob header, dirty bits are kept in the secondary hash index and the Blob property. The inclusion of a dirty bit serves as an indication as to the validity of information with which the dirty bit is associated. The system decides whether to use the data in the secondary hash index and Blob header, or to retrieve the data from the Blob property based on if the dirty bits set in the secondary hash index and the Blob property. In an exemplary embodiment, the Blob property and the secondary hash index can both contain a dirty bit indication, which would indicate:

1. Hash data consistency (HID)—indicates that the additional data items in the secondary hash index entries are dirty or not and if they can be utilized. For example, if a dirty bit entry is in the secondary hash index, the information associated with the dirty bit is not a reliable source to retrieve the information. As a result, those data items are retrieved from a Blob property in a primary structured index.

2. Blob Header data consistency (BHD)—indicates that the data in the Blob header stored in a Blob stream is dirty or not and whether it can be utilized. Similar to the hash data consistency, in an exemplary embodiment, if a dirty bit is set for the Blob header, which would indicate that the information of the Blob header is not a reliable source from which to retrieve the information.

An important aspect in an exemplary embodiment is how to deal with dirty bits while maintaining consistency of the system. Anytime there is an update to a Blob property data item that is stored in either a Blob header or in a hash index entry, then either (a) a dirty bit has to be set, or (b) the data has to be updated. If the dirty bit is only set in the memory table on update, then the dirty bit should be set in the hash index entry when the memory table is checkpointed. In an alternative, there should be a change list that is maintained and lazily (or eagerly) applied to the hash index. In this embodiment, the hash index should be fully up-to-date (or have the corresponding dirty bits set) when the memory table checkpoint occurs with the contents in the memory table. In an alternative, a change list for corresponding Blob property primary keys should be maintained and have the changes applied to the hash index. The changes in one embodiment are eagerly applied, while in a second embodiment the changes are lazily applied. When lazy update is utilized then either (a) the change list (buffer) has to be looked up along with the hash index to identify recent changes the hash index should be aware of and what is in the change buffer overrides the information in the hash index, or (b) the hash index is not used until the change list is finished being applied to the in memory hash index.

In order to maintain the consistency of the primary index data, secondary hash index data, and the Blob data in the streams, there are a few options for where to store dirty bits.

A first embodiment stores the HID in the primary index row (which means it is also in the memory table), and the BHD is stored in both the primary index row and the hash index entry. Data found in the memory table has priority and is therefore utilized from the memory able when identified there. In this example, where the data is found in the memory table, the hash index or the Blob header is not required. When a memory table is checkpointed, the hash index is updated with the changed data from the memory table rows or the changes are put into a change list as described previously.

When data items (e.g., Blob metadata, expiry time, etc) stored in a Blob header in a Blob streams are updated, then the BHD is updated in the primary index row in the memory table (and it is persisted when it hits the file table). In this example, the BHD bit is also updated in the secondary hash index. This provides an indication in the hash index those related fields in from a Blob header should not be utilized. In this example, once the BHD is set for a Blob property, it is cleared when the Blob header is rewritten in the Blob stream with the up-to-date information. In an exemplary embodiment, the Blob header is rewritten during a garbage collection process or when Blob access with a dirty bit achieves a predefined threshold.

Continuing with the discussion on maintaining consistency in the system. In an exemplary embodiment, whenever a Blob property data that is stored in the secondary hash index is updated, the Hash data consistency dirty bit (1) above is set. Whenever Blob property data that is stored in the Blob header is updated, the Blob header data consistency dirty bit (2) is set above. The system first tries to look up a Blob via the memory table, and if the data is not found there, then it looks in the secondary hash index, and if the dirty bits are set for the additional Blob fields that need to be read, then the Blob property row is read from a row store to get the data. If those dirty Blob fields are not required or the dirty bits are not set, then all of the data needed to process a "get Blob" request can be served from the secondary hash index, Blob header, and the Blob bits. This efficiently avoids the need to do a Blob property lookup. In an exemplary embodiment, when dirty bits are set, the dirty bits are cleared for the Blob property and secondary hash index when the corresponding secondary hash index entry and/or Blob header is updated with the most recent value. The Blob headers can be updated lazily by rewriting the Blob header with the new data, which then allows the BHD dirty bits to be cleared in the primary index and hash index. An alternative exemplary approach is to clear the dirty bits by rewriting the Blob header only during a garbage collection and compaction of Blob headers, blocks, and/or Blobs. A lazy update is one that may occur when excess system resources are available. As opposed to an eager update that occurs at the time the request is made.

In an embodiment where the memory table for the Blob property is looked up prior the secondary hash index, the most recent view of the data will be available. Therefore, the secondary hash index can be updated lazily without sacrificing data consistency. When the memory table is written to a file table, the file table is added to a pending queue of the secondary hash index. In this embodiment, the secondary hash index is allowed to serve data only when the pending queue (change list) is empty. In this embodiment the dirty bit for the secondary index is not in the secondary hash index but instead in the primary index. This tells the primary structured index that it needs to update the secondary hash index for the Blob property at some later point. For example, when the queue includes an indication that an update is pending for the secondary hash index, the secondary hash index is not able to serve data, or at least portions of the data, until the queue is empty. In another example when the secondary hash index entry is updated when the memory table or the file table entry is updated, the pending queue is therefore empty. In another embodiment, when the secondary hash index is updated lazily, the secondary hash index keeps track of the last file table it has processed and the number of items in the pending queue.

Periodically, in an embodiment, the secondary hash index is checkpointed to a file table stream. In this situation, on partition load, the secondary hash index is lazily loaded and it resumes the processing of the pending file tables based on last processed file table. For better performance, an embodiment suspends the updates to the secondary hash index when the table server is starting to split the partition, merge two or more partitions, and/or garbage collect the metadata stream of the partition. The secondary hash index is made consistent again or created again when the updated partition loads either as part of the partition load or lazily after partition load is complete. If it is created, as part of its creation in an embodiment, the secondary hash index processes all the available file tables before serving the data and memory tables Returning to FIG. 8, the Blob store 806 is a storage location of the Blob bits that are indexed in the primary structured index 802. In one example, the Blob data is stored in the Blob log stream 808. In yet another example, the Blob data is stored in the Blob data stream 814. In yet another example, the Blob data is stored in a combination of the Blob log stream 808 and the Blob data stream 814.

For example, to achieve the single write Blob insert/update, the Blob data is stored in the Blob log stream until the partition is checkpointed, at which point, the Blob data can be moved from the Blob log stream to store in the Blob data stream 814. This transformation is accomplished, in an exemplary embodiment, using a multi modification that results in no physical data moving, but instead pointers to the data are changed/created. In another embodiment, when a "partition is checkpointed," which means for this embodiment that the memory tables are checkpointed to file tables. When the partition is checkpointed, instead of moving the data from the Blob log to the Blob data stream, the pointer is stored to indicate where in the Blob log stream a replay should begin to reload the partition The pointer is adjusted when the partition is checkpointed A similar concept is employed in some embodiments to a row update log. Then the data in the Blob log is transferred to the Blob data stream after the Blob log reaches a certain size.

A Blob log stream typically includes blocks, such as the block 812, storing a Blob. As an optimization in an embodiment, table transactions associated with Blob and/or block writes are written into this Blob log stream as a record, such as the record 810, instead of being written into a row update log of a partition. The table transactions are also included along with the Blob/block data records. In this embodiment, this allows the Blob and/or block write and a corresponding table index update to be written to the stream layer in a single write. This allows a single Blob/block update to be committed in a single write with a success indication sent back to the application in 212 of FIG. 2, without having to do a second write to the row update log. The memory table contains a full updated row. In this embodiment, during partition loading that memory table row is recreated from the Blob log (which is replayed) instead of the row update log. For Blobs with multiple updates before a memory table checkpoint occurs (e.g., insert Blob into a store and then update the Blob's metadata), to recreate the latest memory version of that Blob/row, information (e.g., the original insert of the Blob from the Blob log) are retrieved from the blob log, and other information (like the later update of the Blob's metadata) are retrieved from the row update log. A single write of the Blob or block bits provides an efficiency for Blobs in a structured storage system. Therefore, table transactions that involve Blob or block data bit writes are written into the Blob log stream, and other table transactions (like update of the Blob's metadata) are written into the row update log stream as normal. When a table server loads a partition, it uses the table transaction information stored in the Blob log stream and the row update log to reconstruct the correct ordering and the memory table index for that partition.

In an embodiment, a Blob data stream, such as the Blob data stream 814, is updated once a memory table is checkpointed. The corresponding table transaction logs in the Blob log stream are no longer useful following the checkpoint. The corresponding Blob and/or block data in the Blob log stream is moved to Blob data stream. This does not have to occur at the same time as the memory table checkpoint, and instead a pointer is maintained in the Blob log to know where to begin the replay. In an embodiment, a Blob garbage collector (to be discussed later) operates over the Blob data stream. The garbage collection copies the Blobs/blocks that are identified as active to the end of the Blob data stream. When this is done, the Blob data (blocks, CBLs, TBLs, etc.) can be aligned to be sequential in the Blob store.

In an exemplary embodiment, during a partition checkpoint, stream features, such as those previously described, are used to atomically create a new Blob log stream. This operation moves the extents after the last checkpoint from the old Blob log stream into the new Blob log stream. The extents are moved because they are still needed, in this embodiment, for a replay. Additionally, the extents move before the checkpoint from the old Blob log stream into the Blob data stream. After both of these are done, then the operation deletes the old Blob log stream. In this embodiment, these are done in one atomic transaction at the stream layer to achieve the effect of atomically truncating extents before the checkpoint off the Blob log stream, and moving them into the Blob data stream.

Figure 9:
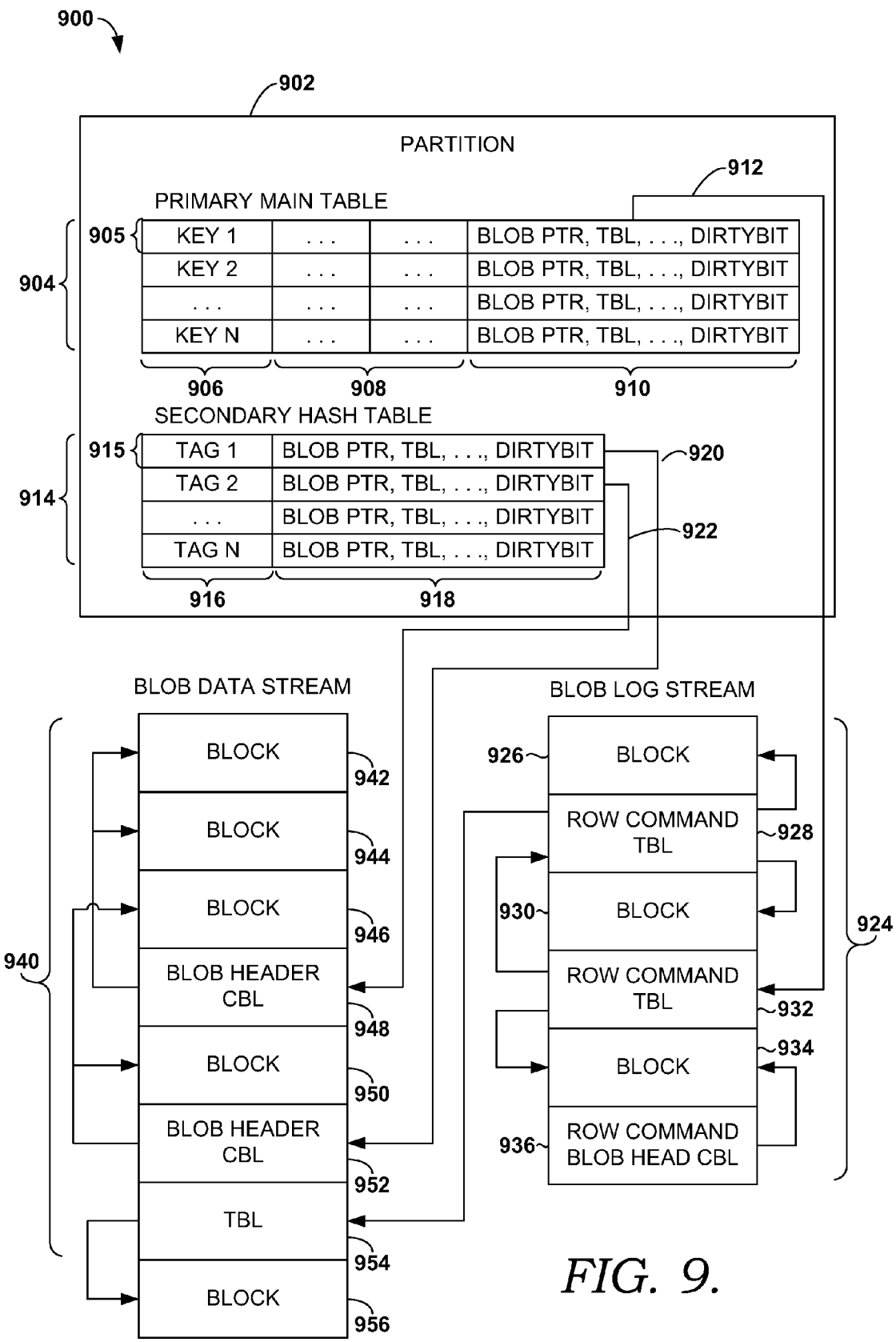
FIG. 9 depicts a block diagram illustrating an exemplary data structure in accordance with an embodiment of the present invention.

Turning now to FIG. 9, a block diagram is provided illustrating an exemplary data structure 900 suitable for embodiments of the present invention. The data structure 900 includes a partition 902 comprised of a primary structured index 904 and a secondary hash index 914. Additionally, the data structure 900 includes a Blob log stream 924 and a Blob data stream 940. Further, as previously discussed with respect to FIG. 3, a partition in an embodiment includes additional elements discussed with respect to FIG. 3. Components of similar name in the data structure 900 to those previously discussed with respect to FIG. 8 are comparable in one or more exemplary embodiments. For example, the primary structured index 904 is comparable to the previously described primary table 802 of FIG. 8.

The primary structured index 904 includes columns 906, 908, and 910. The column 906 is a primary key column. For example, at the intersection of a row 905 and the column 906, a primary key is indicated as "Key 1." The row 905 corresponds to a particular Blob that is indexed by a key value of "Key 1." As previously discussed, multiple keys and/or values may constitute a primary key, therefore, the scope of the present invention is not limited by discussion of a single column or key with respect to FIG. 9. But, instead it is understood that FIG. 9 is merely an exemplary embodiment intended for illustrative purposes. The columns 908 include information useable for the application to be accessed via a structured storage system, as well as system information potentially only accessible by the storage system in a structured storage system. Column 910 is a Blob property. As previously discussed, a Blob property, such as the Blob property 910, may include a variety of information about the Blob. For example, a pointer to the Blob located in a Blob store (Blob pointer), a corresponding TBL, last modified time, creation time, expiration time, and a dirty bit may be included in the Blob property along with other information.

The secondary hash index 914 includes a column 916 and a column 918. The column 916 is a tag column that includes a tag or key by which a respective Blob is identified. The column 918, in this exemplary embodiment, includes a pointer to the Blob in a Blob store as well as a dirty bit that can provide an indication as to the validity of this particular data. Additional information may be contained in the column 918. For example, in an embodiment additional metadata relating to the Blob is included in the secondary has table 914, an in particular the column 918.

In an exemplary embodiment, a secondary hash index should include the following properties.
1) A hash value to randomly distribute the key over the hash index.
2) Ability to optimize the number of hash entries kept in memory to reduce the amount of memory each hash entry takes. Therefore, having a minimal amount of tag bits stored in the hash index. In addition, to save resources, such as memory, a hierarchical hash index may be implemented, where a first hash index page that is then used to jump to a second level hash index, pages, etc.
3) Every Blob in the partition does not need an entry in the hash index. It is therefore allowable for a "miss" in the hash index because of the primary structured index. This is important for some partitions the memory size grows too large for the hash index, which may result in page faults harming the server.
4) Ability to handle a hash index miss. If there is no partial tag match for a hash entry then that means the Blob is not located in the hash index. Therefore, it should be read from the primary index.
5) Ability to identifying that a Blob pointed to by the hash index matches a Blob being looked up. Because a full tag of the Blob primary key is not stored in the hash index, the Blob is validated by the Blob key that is stored in the Blob header with the Blob key that is being looked up. If they match, there is consistency. If not, then the Blob information is retrieved from the row store.
6) Dealing with collisions in the hash index. If, at the final level a hash index a tag hit is received, but multiple Blobs alias are returned to the same entry, multiple hash index entries are kept. Additional tag bits are added for each Blob hash entry to distinguish the different Blobs that hash to that identifier.

It is understood that the primary structured index and the secondary hash index are not limited in the quantity or type of columns, rows, cells, properties, or information contained therein. The primary structured index and the secondary hash index are merely provided for illustrative purposes and are not limiting on the scope of the present invention.

The Blob log stream 924 includes blocks 926, 930, and 934. Additionally, the Blob log stream 924 includes TBLs and Row Commands 928 and 932, which are the table transactions associated with the Blob/block writes as described earlier. Further, the Blob log stream includes a row command, Blob header, and CBL 936.

The Blob data stream 940 includes Blocks 942-946, 950, and 956. Additionally, the Blob data stream 924 includes Blob header and CBLs 948 and 952. Further, the Blob data stream 940 includes a TBL 954.

The data structure includes a variety of reference lines to indicate relationships that are referenced among various elements. For example, the Blob properties of row 905 reference to the row command and table 932 of the Blob log stream 924. The reference 912, in this embodiment, indicate that a pointer exists that is directed to the Blob log stream 924 at the block identified as 932, which contains a TBL and the row command (the table transaction) that is associated with that Blob write. Therefore, the pointer to a TBL for a Blob of row 905 is stored at the block identified as 932, which contains a TBL of the Blob as well as the table transaction. Similarly, a reference 920 and a reference 922 indicate a pointer directs to the Blob data stream 940, and in particular, reference 920 is a pointer to a block previously identified as Block header CBL 952. Therefore, that block includes the block header and CBL for a Blob associated with row 915 of the secondary hash table 914. Similar reference lines are represented in the Blob log stream 924 and the Blob data stream 940. For example, reference lines are depicted from row command TBL 928 to blocks 926 and 930. Blocks 926 and 930 are blocks listed in the TBL of row command TBL 928. Additionally, Blob header CBL 948 includes blocks 942 and 944. Therefore, blocks 942 and 944 store data of a Blob associated with the reference line 922 from the secondary hash table 914.

Turning to FIG. 10, a table 1000 representing an exemplary circumstance that combines structured storage data and Blob data, in accordance with embodiments of the present invention. The table 1000 includes columns 1002, 1004, and 1006, which all includes traditional data to be stored in a structured storage system. Columns 1008 and 1010 include Blob properties. The Blob properties, in this embodiment, prevent the need for a separate Blob storage system with its own table to store and retrieve the Blobs. Instead, Blob storage is seamlessly integrated in to a structured store.

An embodiment of a structured storage system with Blob integration allows for any normal table that would be utilized to store entities (object rows) to also store Blob properties, thus preventing the need for a separate Blob table to store and retrieve the Blob. For example, as shown in FIG. 10 with the table 1000. A key point is that an embodiment of the invention includes columns 1008 and 1010 as "Blob property" types, of which it is within the scope of the present invention to have as many or few as necessary for a single row in the table.

Advantages of utilizing Blob properties in various embodiment of the present invention include:

1) A row can have many Blob property columns.
2) The unique key for a Blob property is a combination of (a) the primary key for the row plus (b) the column (or column name) of the Blob property. This uniquely identifies each Blob property within a row/entity. This is important because it is stored in the Blob header to map back to which row and column the Blob in the Blob store belongs.
3) The Blob data can be stored in the Blob store, such as Blob store 806 in previously discussed FIG. 8. Or, if the data is small enough it can just be inlined inside of the Blob property column and stored inside of a row store. The benefit of this is that if the Blob data bits are small, whole Blob can be retrieved plus all of its metadata from reading just the primary index row containing the Blob. Therefore, the Blob store would not have to be accessed at all. The structured storage system will decide based on heuristics if the Blob is inlined or not. The schema of the table will specify if the Blob property column is to (a) always inline, (b) always go to the Blob store, or (c) allow the storage system to decide and optimize the placement. For Blobs that are stored in 806, the advantage of this is that it moves the Blob data out of the row data to allow for efficient querying of the row data (along with Blob metadata) while not having to page in the Blob data to traverse the rows being queried.
4) If a Blob data bits are inlined into the Blob property, and the in the memory of the secondary hash index as the primary means for accessing the Blobs, then tombstones may be stored in the hash index entry for that Blob. This is just a partial tag indicating that the Blob should be read from the primary index file tables to get the data and not the Blob store.
5) For this type of table, the secondary hash index may or may not be used. The definition of the schema for the table will specify if it wants to use the secondary index or not. If the secondary index is used, this allows for efficient lookup, where the key for the secondary index is a combination of (a) the primary key of the row, plus (b) the Blob property column/column-name.
6) If a row is deleted in the table, with several Blob properties in the row, the Blob garbage collection system will realize this and garbage collect the Blobs from the Blob store automatically. This is a huge benefit, and it provides seamless consistency between the row and the Blob data, which applications have to maintain themselves if they are using a separate table and Blob store as is traditionally used.

Returning to FIG. 10, an example includes table 1000, which represents a table that indicates items for sale on an online service. Each item for sale consumes a row of the table 1000. A typical item for sale will include an item name in column 1002, a description of the item in column 1004, and an item price in column 1006. Additionally, each item may include one or more Blobs to facilitate the sale of the item. For example, the Blob may be a first picture of the item represented in column 1008 and a second picture of the item represented in column 1010. The actual Blobs of the table 1000, in this example, would be stored in a layer of the architecture, such as the stream layer, the structured storage layer, or the Blob storage integrated as part of the structured storage layer.

The data of table 1000, to be efficiently queried, could be stored in a structured storage system that provides integrated support for a Blob, such as the Blobs represented in columns 1008 and 1010. For example, each of the Blobs of the table 1000 may be stored on a table server, such as a table server 204 of FIG. 2. When a query is to be performed by an application, such as the application 212 of FIG. 2, the application utilizes a table client to retrieve the Blob data. The table client identifies from a partition map which table server is serving a partition that includes the desired Blob data. Once the partition has been identified and the table server serving the partition, one or more blocks of the Blob are identified. In this exemplary embodiment, the blocks are identified either by way of a TBL, if the blocks have not been committed or by way of a CBL if the blocks have been committed. Continuing with this example, the TBL or CBL associated with the Blob may be identified through either a primary structured index or a secondary hash index of the table server. Each of the primary structured index and the secondary hash index may include one or more pointers to the CBL, TBL, and/or the Blob header. In this example, the block(s) storing the Blob data are able to be identified based on the CBL, TBL, and Blob header. In an additional embodiment, a key value associated with the Blob facilitates a single hash lookup. Additionally, the primary structured index facilitates traversing alpha-numerically over the Blob namespace in order for a query to be efficiently conducted over the structured storage system while still including Blob data. In another embodiment, the Blob namespace is hashed itself by the properties that make up the Blob namespace and this hash value is part of the primary key for the rows. This allows for efficient enumeration within a partition, and it randomly spreads out the partitions across the namespace.

When using this invention to create a Blob service the Blob service interface may include functionality that allows for various operations to be supported. Examples of those operations include Put Blob, Put Block, Put Block List, Append Block List, Get Blob, Get/Set Blob Properties, and Get Block List. It is understood that the title assigned to the above-mentioned operations is not limiting but merely provided for purposes of illustration. The previously mentioned operation may perform the following functions in one or more embodiment of the present invention. The Put Blob operation creates a new Blob or replaces an existing Blob in the storage system. The Put Block operation writes a block to the store. When the block is written to the store, the block ID may be tied by a particular Blob, use some other grouping, or it may be globally unique. If the block is shared by multiple concurrent writers, it is suggested in an embodiment that the block ID uniquely identifies the block contents. The Put Block List operation commits a set of blocks to represent the contents of the Blob. Additionally, a Blob name and a list of blocks to represent that Blob name in the store is specified in an embodiment. The order of the blocks in the list, such as a CBL, is the order used when reading the Blob in an embodiment. Continuing with this embodiment, the blocks are uploaded into the system using the Put Block operation before committing, and then using the Put Block List operation to commit a set of blocks to represent the contents of the Blob. This allows a Blob to be represented by blocks that already exist as part of other Blobs in the store, as well as blocks that are not part of any committed Blob. It also allows updating an existing Blob, by adding, replacing or removing blocks from the CBL. A block ID may be specified more than once in the block list.

In an exemplary embodiment, these are commands utilized by a Blob service that is written on top of an integrated structured storage system. The operations of the interface also may include the Append Block List operation that commits new blocks at the end of an existing block list, such as a CBL. In an embodiment, the Get Blob operation gets a complete or partial content of a Blob starting at a specified offset (from the start of the Blob). The Get Blocks operation allows an application to specify a list of blocks to retrieve, and the blocks are returned in the specified order for an embodiment. Additionally, the Get/Set Blob Properties operation may provide a function for setting and getting properties and metadata for a Blob. Further, the Get Block List operation may return the committed block list for a Blob.

Utilizing the Blob interface and the operation facilitated by the interface a variety of functions may be performed. For example, the Get Blob operation, in an embodiment, utilizes the secondary hash index for fast lookups on Get Blob calls. This is done by mapping from a Blob's primary key, which may be the Blob's name, to the secondary hash index entry that contains a pointer to a committed Blob header in persistent storage. The secondary hash index may also include a pointer to the TBL or CBL for the Blob, also thereby facilitating a fast lookup on a Get Blob operation.

An additional operation, the Put Blob operation, can be utilized through the interface. The Put Blob interface, in an embodiment, utilizes the Blob log stream, which provides the ability to do a Put Blob operation in a single I/O to the stream layer. A Put Blob operation, in this embodiment, begins with reading a prior row data if one exists in the Blob's name or key value. Then, the operation writes new row data as part of the Blob header along with the Blob data as a single write I/O to the Blob log stream. A memory table is updated with the row associated with the Blob. In an exemplary embodiment, there is no need to write the transaction into a row update log, because if a failure does occur with a table server serving the Blob, the Blob header and Blob log include the information required to reconstruct the table server from the previous checkpoint that is identified by the tale update log.

In an embodiment, the Blob layer is integrated with the structured table layer. Therefore, the Blob updates are done by way of table transactions. Each Blob update operation (e.g. Put Blob), in this embodiment, involves writing Blob data into a Blob stream as well as updating the corresponding table index persistently. As an optimization in this example, the corresponding table transactions (row command) along with the Blob/block data are written into the Blob log stream in a single append. When the partition is loaded, the table server needs to replay all the transactions in both the row update log and the Blob log in order to rebuild the in-memory table index. In this embodiment, the logs in the Blob log stream need to be replayed in the same order as when the original transactions took place. As a result, each log has a sequence number indicating the order of the transaction. The replay should follow the order of these sequence numbers. However, since the Blob log stream can be written by multiple threads concurrently, the table transaction logs on a disk may be out of order (in terms of their sequence numbers). Furthermore, the sequence numbers may not be consecutive (e.g., due to failures, there can be missing logs). Therefore, during replay, in the worst case, the entire Blob log stream needs to be loaded and sorted in memory. This is typically not scalable.

To provide scalability in this situation a sequencing scheme is utilized that allows replay logic to quickly play all the transaction logs in order. Therefore, only a small number of transaction logs must be traversed, thereby addressing the scalability issue. This is accomplished in a particular embodiment by the table server utilizing a sequence number allocator, which is responsible for generating sequence numbers. In this example, a sequence is in the form of <Current Sequence, Last Acknowledged Sequence>. Each transaction is assigned such a sequence number (in increasing order). The "Current Sequence" is the sequence number of the transaction. "Last Acknowledged Sequence" is the highest sequence before which all transactions have been acknowledged of completion. Once the transaction is done, a processing thread acknowledges the sequence number allocator of the completion of the sequence number. The allocator keeps track of the "Last Acknowledged Sequence." During replay, the highest "Last Acknowledged Sequence" cell of the sequences is kept in memory as the Blob log stream is scanned. All of the transaction entries with "Current Sequence" smaller than the "Last Acknowledged Sequence" value can be replayed. In this way, we only need to look ahead a small number of log entries and keep them grouped in memory so they can be extracted in a sorted order.

Figure 11:
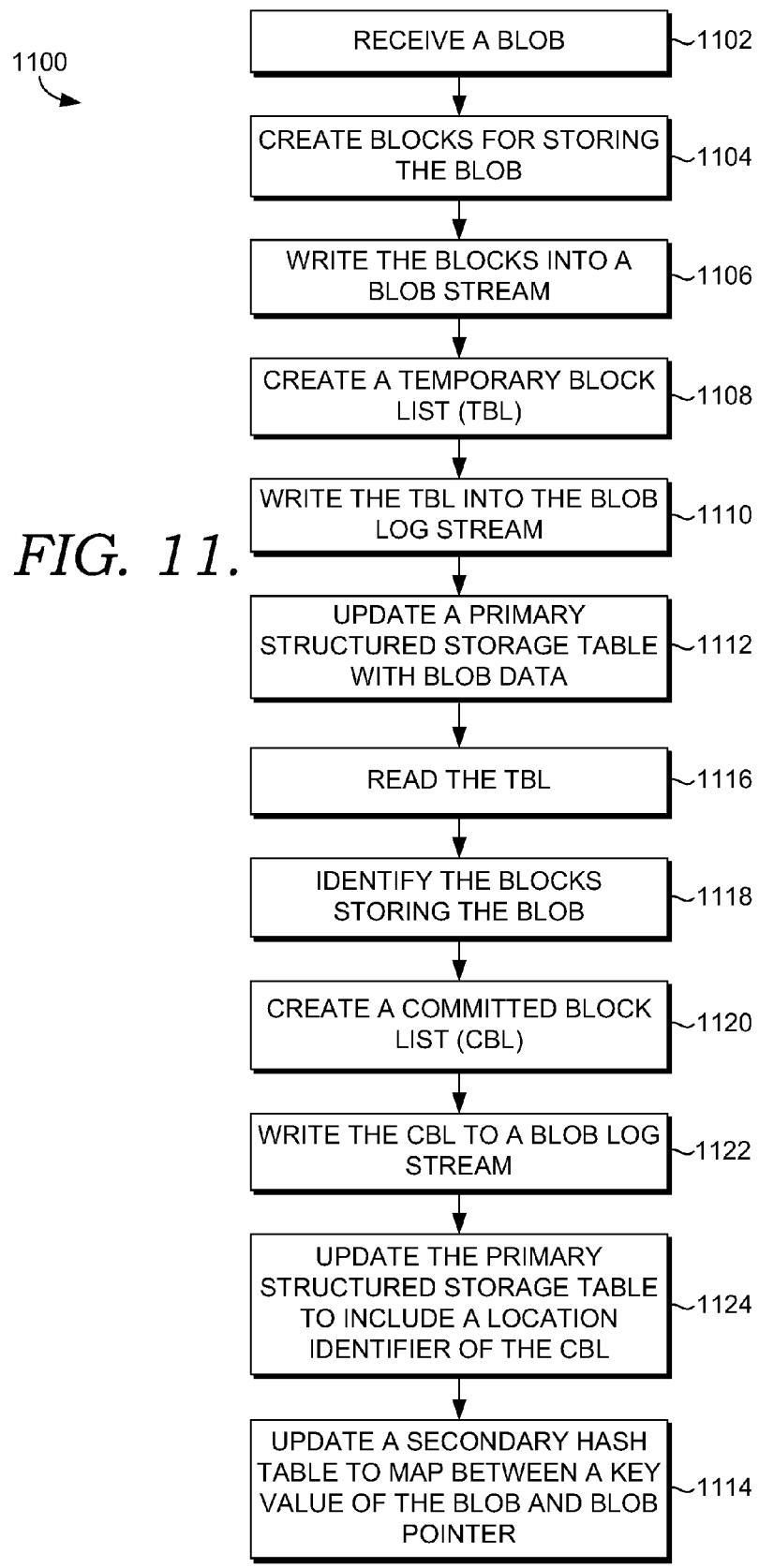
FIG. 11 depicts a flow diagram illustrating an exemplary method for writing a Blob in a structured storage system to one or more computer storage media in accordance with an embodiment of the present invention.

Turning to FIG. 11, a flow diagram is provided depicting an exemplary method 1100 for writing a Blob in a structured storage system to one or more computer storage media, in accordance with embodiment of the present invention. Initially, as shown at a box 1102, a Blob is received. A user may provide the Blob, for example, as part of an online sales site as previously discussed with respect to FIG. 10. The Blob may be received as part of a Blob interface that facilitates a Blob Put operation to allow the Blob to be stored as one or more blocks on a table server.

As shown at a box 1104, one or more blocks are created for storing the Blob. The blocks will store the Blob data in a Blob store. For example, the blocks are created to store the data of the Blob in a Blob log stream or a Blob data stream. In an exemplary embodiment, the blocks are written to a log stream until an associated memory table is checkpointed. The creation of the blocks is initiated, in an exemplary embodiment, with a Put Block operation. Depending on the size and system schema, the number of blocks created could vary with each particular Blob that is to be written into a structured storage system. In some instances, a block that is created at box 1104 is a block shared by multiple Blobs. In another instance, because the blocks may be shared, not all blocks required for a particular Blob are created, but instead referenced in a block list.

As shown at a box 1106, the blocks created at the box 1104 are written in a Blob stream. In an exemplary embodiment, the writing of the Blob into the stream is done as a result of an operation comparable to a Put Block operation previously discussed. In one instance, the Blob stream is a Blob log stream. In yet another embodiment, but not a mutually exclusive instance, the Blob stream is a Blob data stream. An embodiment of the present invention does not require the blocks to be written in a sequential order to the stream, or even a continuous fashion to the Blob stream. Instead, the blocks may be written in any order or sequence. In this embodiment, the sequence will be identifiable by a block list.

As shown at a box 1108, a temporary block list (TBL) is created. In an exemplary embodiment, the TBL is created and written with the block for the Blob. If the Blob has a prior TBL, which would indicate that a prior uncommitted block was subject to a Put operation, the created TBL includes a pointer to the previous TBL. In this situation, the TBL created at box 1108 is written to the Blob log stream, as shown at a box 1110. In an embodiment, the TBL and the blocks are written to the Blob log stream at the same time. Additionally, in some instances it is advantageous for optimization purposes to group together chained TBLs. For example, if a new TBL includes a pointer to a previous TBL, it is advantageous to group the two TBLs together in the Blob log stream because both TBLs need to be traversed when committing a Blob. Therefore, in an exemplary embodiment, to optimize a Blob commit, before writing a new TBL, the table server tries to merge it with the previous TBL, where the previous TBLs are skipped in the current write if the two TBLs are merged. This process can reduce the amount of time required to commit a Blob. The TBL pointers used for this chaining functionality, in an embodiment, are obtained from a Blob property cell associated with the Blob.

As shown at a box 1112, a primary structured storage index (also referred to as a primary structured index) is updated to index the Blob. For example, the Blob property in the primary structured storage index may be updated to provide a current pointer to the TBL written at box 1110. In some instances, metadata associated with the Blob is updated in the primary structured storage index. In yet another embodiment, the primary structured storage index is updated to facilitate the one-lookup access and the Blob access integrated into structured storage because without the indication contained in the primary structured storage index relating to the Blob, that functionality would not be possible in some embodiments.

As shown at a box 1116, the TBL is read to identify the blocks storing the Blob. As previously described, the TBL may include a pointer to a previous TBL associated with the Blob. The previous TBL, along with any other chained TBLs, may be read to identify additional blocks storing the Blob. The blocks storing the Blob are identified from the TBL or chained TBLs, as shown at a box 1118.

As shown at a box 1120, a CBL is created. The CBL includes the identified blocks that store the Blob. The CBL is written to a Blob log stream or a Blob data stream, as shown at a box 1122. Additionally, the primary structured storage index is updated to include a location identifier, such as a pointer, of the CBL, as shown at a box 1124. In an embodiment, on committing a Blob, a new Blob header is written to the Blob log stream. The Blob property in the primary structured data table row is updated with a pointer to the Blob log stream location of the Blob. An internal writing engine may rely on being passed a Blob header and a TBL of the Blob so that it can resolve existing blocks in the system and construct a new committed view of a Blob.

In an embodiment, when committing a Blob, the TBL list is traversed for block IDs listed. In the case of multiple persisted blocks having the same ID, the newer temporary blocks are chosen over the older temporary blocks. When all the blocks are found for the Blob, a CBL is typically created. The CBL, in an embodiment, is stored as part of the Blob header for the Blob. In this example, the Blob property in the primary structured data table is then updated to reflect the committed view of the Blob In another exemplary embodiment, the writing of a Blob with only one block may be considered a special case and the write is optimized for read access. In this case, the Blob data is sent to the table server in a single Put Blob type of operation. The Blob header, CBL, and the Blob data is written together in a single stream write. Because, in this example, the Blob header is immediately followed by the CBL and the Blob data, when reading the Blob, the CBL and Blob data can be fetched in one read from the stream layer.

As shown at a box 1114, a secondary hash index is updated to map between a key value of the Blob and a Blob pointer. In some instances, the key value is the Blob's name. In yet another instance, the Blob pointer is directed to a Blob header of the Blob. The Blob pointer, in another embodiment, is directed to the CBL written in Box 1122.

Figure 12:
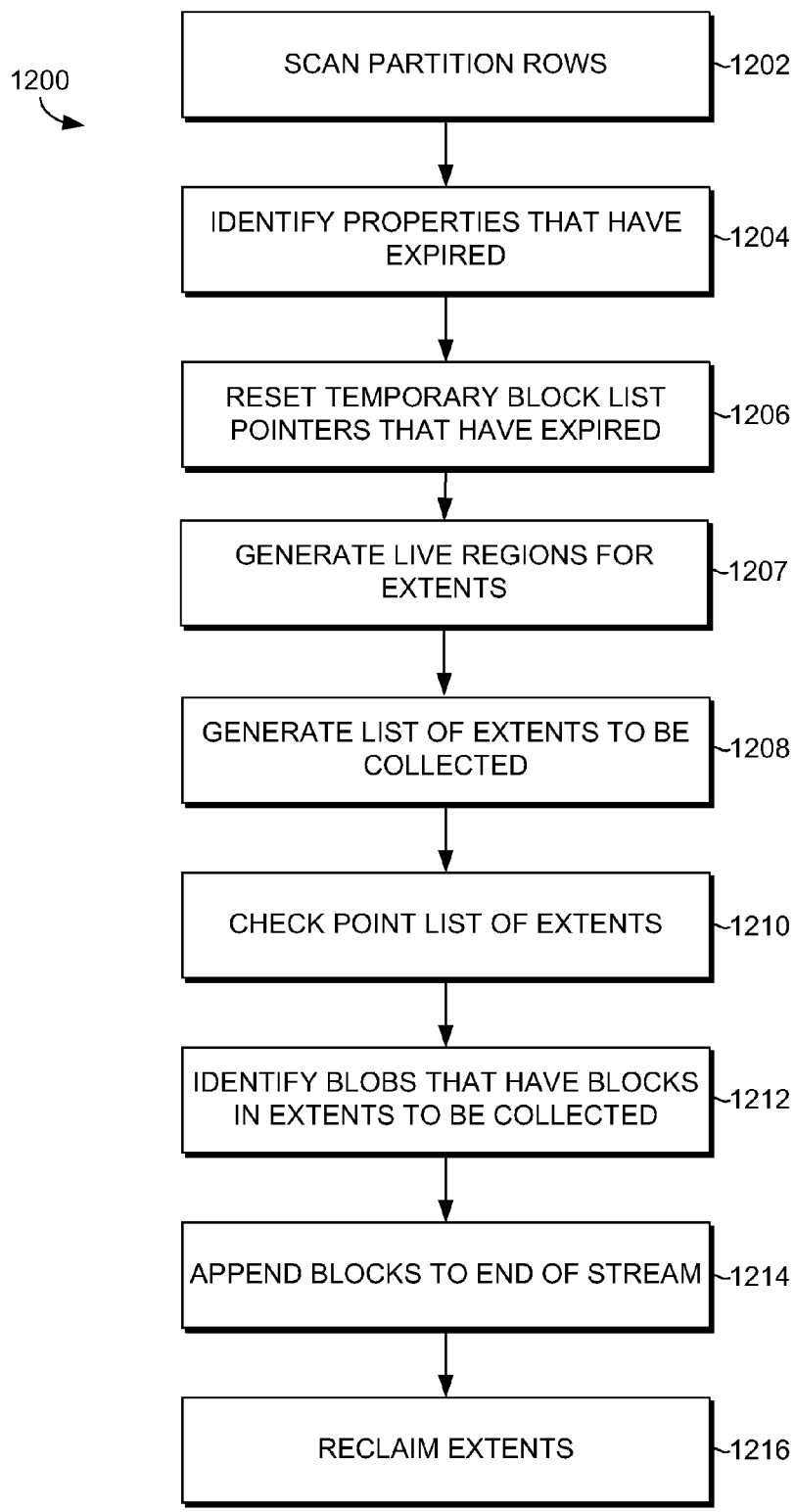
FIG. 12 depicts a flow diagram illustrating an exemplary method for garbage collection in a structured storage system in accordance with an embodiment of the present invention.

Turning now to FIG. 12, a flow diagram is provided depicting an exemplary method 1200 for garbage collection in a structured storage system, in accordance with embodiment of the present invention. In an exemplary embodiment, garbage collection includes the following responsibilities. The removal of expired or deleted Blobs from the Blob store that are on longer referenced from the row (structured) part of the partition, the freeing of storage space and defragmentation, and improving Blob access performance.

The removal of expired/deleted Blobs from the Blob store, in an exemplary embodiment, utilizes an expiration time for each Blob. After a holding period (e.g., 1 hour, 1 day, 1 week, 1 month, or 1 year) beyond the identified expiration, for expired Blobs, they are removed from columns and rows in the tables and their storage space in the stream layer can be freed. Furthermore, all the Blobs not referenced by the main table index for a partition can be removed from the Blob store in this embodiment. For expiration, a garbage collector system needs to periodically scan through the rows of the partition and the Blob properties and remove properties that contain such Blobs.

In addition, when scanning through rows, structures in the Blob store streams that are still live are tracked, in an embodiment, because they are referenced from the Blob properties in the partition rows. That Blob data is considered live, and all other Blob data in the Blob log and Blob data streams can be deleted. This applies to applications that have tables with just a single Blob property as shown in FIG. 9, as well as applications with many Blob properties in their table rows as shown in FIG. 10.

The freeing of storage space and the defragmentation may be performed as Blobs are deleted. During the deletion, an extent in a Blob stream may contain active regions (those blocks and Blob headers that are still in use) and free regions (those that have been deleted, expired or from failed operations). Garbage collection finds extents with large free regions and moves the active blocks in the old extents to a new extent. This allows the old extents to be freed.

Garbage collection may also improve Blob access performance. There are at least two scenarios for which moving or reorganizing the layout of the entire Blob may improve the latency of Blob access and/or reduce the number of storage I/O. A first scenario is when the Blob headers are adjacent to the Blob data blocks, the first few blocks of Blob data can be loaded while reading the Blob header in one I/O. Otherwise, an additional I/O may be needed to read the first blocks. During garbage collection, the Blob data blocks can be re-aligned with the Blob header to enable this data pre-fetching. A second scenario is when the content of a Blob header is updated (e.g., expiration time or other metadata), the Blob header content in a table property is updated without overwriting the original Blob header in the Blob stream (in this embodiment, the exception to this is the CBL, which is updated in the table at the same time as in the Blob store). The updated Blob header is marked as "dirty" in the secondary hash index, and an additional I/O is potentially needed to retrieve updated information from a main memory index. During garbage collection in this embodiment, when a new Blob header is written, the most recent information from the primary structured index is captured in the Blob header and the dirty bits are cleared in the primary structured index and the secondary hash index.

Initially, as shown at a box 1202, a garbage collection system scans each row of a in a partition that maintain one to many Blob properties. When a Blob property has expiration associated with it (not all of them do), during the scan, Blob property will be deleted from the row when a holding period has passed since an expiration time associated with the Blob. Therefore, as indicated at a box 1204, properties, such as Blobs, that have expired are identified. Additionally, as part of the scanning process, TBL pointers that have not been updated within a predefined period of time are reset, as shown at a box 1206. In an embodiment, the scanning includes constructing a view of active regions for sealed extents in the Blob stream. This involves scanning the rows in the partition, finding rows with Blob Properties that are still live, and seeing what regions of extents are live because they are reachable from the live Blob Properties in the rows. Extents whose last modification time is still within a predefined holding period do not need to be inspected. Additionally, extents with an active TBL also do not have to be inspected in this embodiment. In an embodiment, after dealing with expired blob properties, TBLs, and determining what is live for an extent, it is possible to identify the ratio of extents that are live as compared to dead. That ratio is utilized to determine if the extent should be garbage collected. Additionally, by identifying the live regions, it is therefore known what parts of an extent should be copied if that extent is garbage collected. Shown at a block 1207, live regions for extents are generated.

Based on the information obtained from boxes 1202-1207, a list of extents to be collected in the Blob data stream is generated, as shown at a block 1208. In one instance, if certain criteria are met for an extent (e.g., the ratio between active regions and total extent size is below a threshold), it will be garbage collected. In another instance, the list is populated with extents that are no longer necessary for the structured storage of Blobs.

To ensure progress and tolerate failures, the garbage collection system checkpoints extent lists occasionally when it identifies the extents to be collected and when extents have been reclaimed and the live region of those extents that should be kept as shown in a box 1210. In an embodiment, every time garbage collection starts, it reloads the last available checkpoint, and resumes from that checkpoint. This ensures that garbage collection can make progress in the presence of failures.

As shown in a box 1212, the method identifies Blobs that have blocks in extents that have been identified to be collected. In an exemplary embodiment, the blocks located within an extent to be collected are associated with a Blob by way of a CBL. The CBL allows for those blocks affected by collection of an extent to be matched with a Blob. Blocks are appended to the end of the stream, as shown in a box 1214. The blocks, in an exemplary embodiment, are appended to the end of the stream when the extents in which the blocks were stored are set to be collected. In another embodiment, for smaller Blobs, the entire Blob is re-written in an ordered sequence of blocks. Finally, the method 1200 includes reclaiming the extents that were identified to be collected, as shown at a box 1216. The reclamation of extents includes removing the extents from the stream. More specifically, in one embodiment of this invention, the garbage collection system atomically creates a new Blob data stream, hard-links all the active extents from the old Blob data stream into the new Blob data stream, renames the new Blob data stream to the old Blob data stream name, and deletes the old Blob data stream. This is achieved, in an embodiment, by features of a stream layer as previously described.

Garbage collection, as described above, happens periodically in a separate garbage collection process associated with the table server. This allows for garbage collection of the partitions the table server is serving. The table server, in this embodiment, controls launching and monitoring of the garbage collection process through a monitoring thread. As each table server can serve multiple partitions, ideally, the garbage collection job can be split into independent sub-jobs (e.g., each sub-job is to collect a single partition). In an embodiment, a controller thread of a garbage collection process submits garbage collection sub-jobs to a pool of threads to make them work in parallel. The control thread is also in charge of task assignment, as well as the communication with the table server.

In an additional process that is independent of garbage collection, as described earlier, some Blob data items stored in the Blob header and in the primary index. There is a dirty bit indicating whether these two copies are the same. If they are different, the bit is set; otherwise, the bit is off. To optimize the performance of read access through a table server, the table server can reduce the total number of dirty bits by writing a new up-to-date copy of the Blob header in the Blob stream, and reset dirty bit accordingly. Such optimization will not have the same running frequency as a garbage collection task. Furthermore, it may be desirable to reset the dirty bit based on the access patterns of Blobs. "Dirty" Blobs that are frequently read (especially small Blobs) may have larger impact on performance than dirty Blobs that are rarely read.

Figure 13:
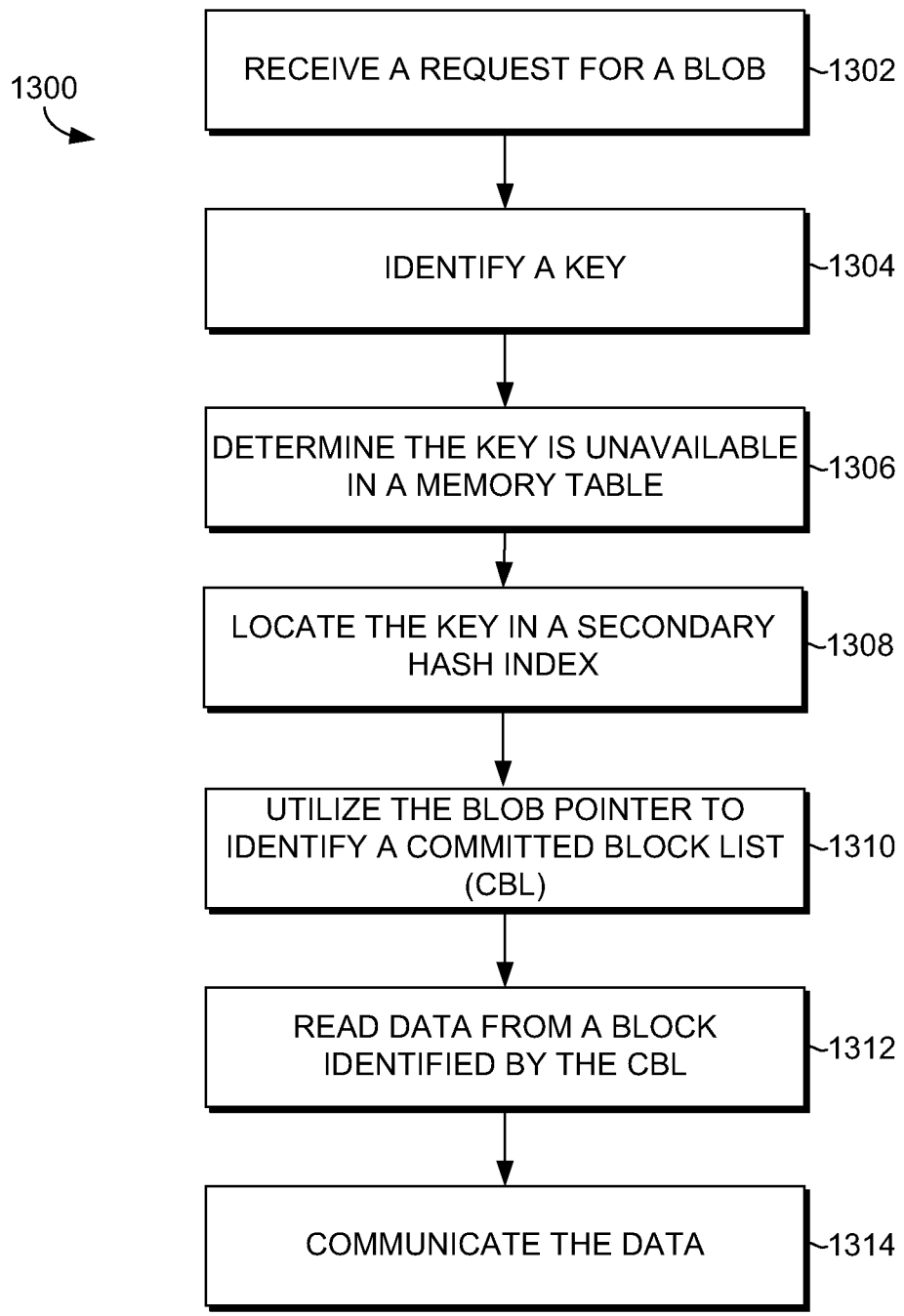
FIG. 13 depicts a flow diagram illustrating an exemplary method for retrieving data of a Binary Large Object (Blob) in a structured storage system, in accordance with embodiment of the present invention.

Turning now to FIG. 13, a flow diagram is provided depicting an exemplary method 1300 for retrieving data of a Binary Large Object (Blob) in a structured storage system, in accordance with embodiment of the present invention. The method, as shown at a box 1302, begins with receiving a request for a Blob. In an exemplary embodiment, the request is received from a computing application, such as the computing application 212 of FIG. 2. In this example, the request received for particular data that defines a Blob. Therefore, the computing application, in an exemplary embodiment, is utilizing a structure storage system that seamlessly incorporates Blob storage. Therefore, a Blob may be accessed in a single I/O as previously discussed. In this embodiment, the request is received by the structured storage system, but the request may be received by other entities or components. The Blob is accessible through a primary structured index, such as the primary structured index 802 of FIG. 8. Depending on the condition of one or more dirty bits associated with the Blob, a Blob pointer or other properties of the Blob may not be accessible from the primary structured index.

As shown at a box 1304, a key is identified. The key, in an exemplary embodiment, is a primary key that is comprised of both a row key and a property key. Therefore, the primary key uniquely identifies the property within the primary structured index. In this example, the key is utilized to locate a Blob pointer related to the requested Blob. As discussed previously, the property may also include one or more dirty bits. In this example, if the key is associated with a dirty bit the data or information associated with the key is not usable as it is may be inconsistent with other information of the structured storage system. Therefore, when the key is utilized to locate a Blob pointer in a primary structured index, the Blob pointer may not be used if one or more dirty bits are associated. As shown in a box 1306, a determination if a Blob pointer is unavailable in the primary structured index is made. A Blob pointer is unavailable, in this example, when one or more dirty bits are associated. Additionally, in this example, the Blob pointer is unavailable if the Blob pointer is not found within the primary structured index.

As shown at a box 1308, a Blob pointer is located in a secondary hash index, such as the secondary hash index 804 of FIG. 8. In an exemplary embodiment, the Blob pointer is located utilizing the key. In an additional embodiment, the Blob pointer is located utilizing a tag or a tombstone as previously discussed. The Blob pointer, once located, is utilized to identify a CBL for the requested Blob, as shown in a box 1310. A CBL, such as CBL 600 of FIG. 6, may include a block extent table, a block dictionary, and a block sequence. Therefore, the CBL provides an indication of one or more blocks that store data associated with the requested Blob. A TBL is contemplated to be utilized in an additional embodiment to identify one or more block associate with the request Blob. Once the blocks are identified that are associated with the requested Blob, data of the blocks are read, as shown in a box 1312. In an exemplary embodiment, the blocks are found within a Blob data stream, such as a Blob data stream 814. But, in an additional embodiment, the blocks are found within a Blob log stream. Finally, the data read from the block or blocks is communicated to the requesting application.

Figure 14:
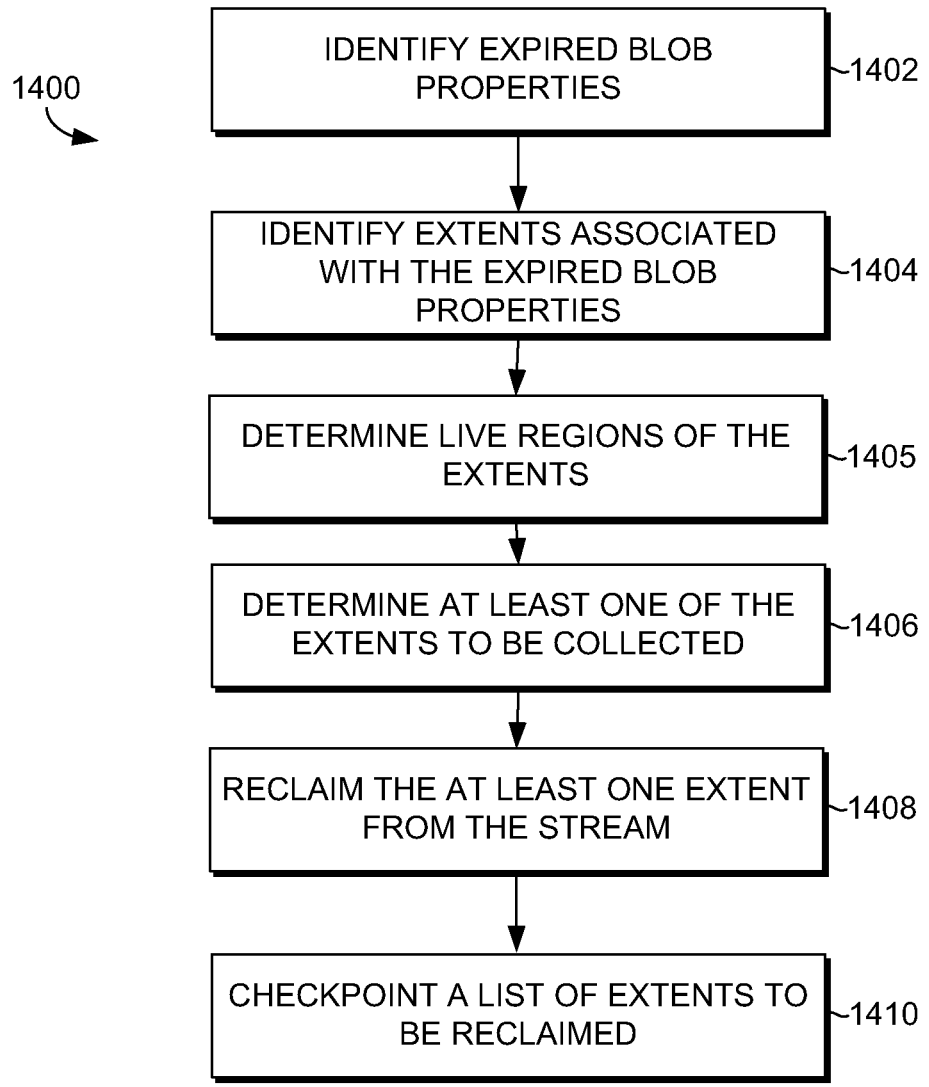
FIG. 14 depicts a flow diagram illustrating an exemplary method for performing a method of garbage collection in a structured storage system, in accordance with embodiment of the present invention.

Turning to FIG. 14, a flow diagram is provided depicting an exemplary method 1400 for performing a method of garbage collection, in accordance with embodiment of the present invention. The exemplary method begins identifying one or more expired properties, as shown in a box 1402. Expired properties include Blobs, data of Blobs, Blob pointers, Blob headers, metadata, and identifiers of a Blob, such as keys and tags. A property expires, in an exemplary embodiment, based on heuristics and/or schemas of the structured storage system. In this example, the properties are within a primary structured index. In an additional embodiment, the properties are part of a secondary hash index. Data associated with the expired properties is typically stored in one or more extents of a stream. Such as a Blob data stream or a Blob log stream. As shown at a box 1404, one or more extents associated with the expired properties are identified. In an exemplary embodiment, the extents are identified based on a CBL or TBL that each may include a block extent table. As shown at a box 1405, live regions of extents within a stream are determined. As previously discussed with respect to FIG. 12, an extent that is associated with a Blob or other data of a primary index is "live" in an embodiment. However, not all portions of an extent are always live at a given time. Therefore, an extent may include live and dead regions. During an embodiment of garbage collection, the extents with live region are moved to a new stream.

As shown at a box 1406, at least one extent is determined to be collected as part of the garbage collection method. In an exemplary embodiment, the extents to be collected are determined based on a utilization ratio. The utilization ratio is a comparison of active portions, portions being utilized by properties that have not expired, relative to inactive (dead) portions that are associate with expired properties. Therefore, once the utilization ration passes a predefined threshold that is dependent on the particular schema or heuristics of the structured storage system, the extent is identified as one to be collected. Additionally, extents, in an embodiment, are identified based on last I/O activity or percent of utilization of the extent.

As shown at a box 1408, at least one extent from a stream is reclaimed. The reclamation of the extent, in an exemplary embodiment, includes creating a new stream. The new stream is where extents that were not determined to be collected will be moved. Therefore, extents that have not be identified as those that should be collected from a particular stream are moved to the new stream in this example. The new stream is named. In one example, the name f the new stream matches the name of the stream from which the extents were moved. Finally, the reclamation process includes deleting the stream from which the extents were moved. As shown at a box 1410, a list of extents to be reclaimed is checkpointed. In an exemplary embodiment, the checkpointing allows for the structured storage system to resume garbage collection process in the event of a failure.

Therefore, in an exemplary embodiment of the present invention, at least five features are utilized, a single I/O Blob read, a single I/O Blob write (to commit back to application), a dynamic inline/outline of blobs with the row data storage, integrated garbage collection of Blobs that are no longer referenced from a row store, and allowing multiple Blob properties per row and to provide that with garbage collection and dynamic inline/outline operations. It is understood that such features are not limiting as to the scope of the present invention, but instead are merely exemplary features of an exemplary embodiment. Additionally, it is understood that none of the mentioned features are dependent on other features. Therefore, various embodiments may employee any and all combination of some or one of the features and still be within the contemplated scope of the present invention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and sub combinations are of utility and may be employed without reference to other features and sub combinations and are contemplated within the scope of the claims. Not all steps listed in the various figures need be carried out in the specific order described.

The invention claimed is:

1. One or more tangible computer storage media having computer-executable instructions embodied thereon for performing a method for retrieving data of a Binary Large Object (Blob) in a structured storage system, the method comprising:
   receiving a request for a Blob from an application;
   prior to searching a persistent file table of the structured storage system for a Blob pointer associated with the Blob, identifying within an in-memory hash index ("hash index") a Blob pointer associated with the Blob, the hash index is a compressed hash index of the file table, wherein the structured storage system comprises a sequence number allocator, wherein the sequence number allocator generates sequence numbers that are assigned to structured storage system; and further wherein the sequence number allocator maintains an indication of a last acknowledged sequence, which is the highest sequence number completed, further wherein, during replay of a Blob log stream, transaction with a sequence number less than the last acknowledged sequence are allowed to replay from the Blob log stream;
   identifying, with a processor, data associated with the Blob, wherein the data is identified, in part, by the Blob pointer; and
   communicating the data to the application.

2. The method of claim 1, wherein identifying data further comprising:
   identifying a Committed Block List (CBL) from the Blob pointer;
   identifying one or more blocks of a Blob stream, wherein the one or more blocks are identified by the CBL; and retrieving data from at least one of the one or more blocks.

3. The method of claim 1, wherein identifying the Blob pointer further comprises searching at least one of a memory table, the hash index, and a file table of the structured storage system, wherein the memory table is an in-memory version of updates for an update log of a partition.

4. The method of claim 3, wherein the memory table is searched first and the hash index is searched second until the Blob pointer is identified.

5. The method of claim 4, wherein the hash index is searched when a key is not found in the memory table.

6. The method of claim 1, wherein identifying the Blob pointer further comprises:
   determining a key for the Blob is unavailable in a memory table;
   and identifying the Blob pointer for the Blob in the hash index.

7. The method of claim 1, wherein identifying data of the Blob further comprises:
   identifying a key in the hash index;
   identifying that one or more dirty bits are not associated with the Blob; and
   retrieving the data from a Blob header of the Blob.

8. The method of claim 1, further comprising
   identifying a key associated with the Blob pointer, wherein the key includes a reference to a particular row of an index;
   locating the Blob pointer in the hash index, wherein the Blob pointer is located utilizing the key;
   utilizing the Blob pointer to identify a Committed Block List (CBL) that identifies one or more blocks of a Blob data stream; and
   reading data from at least one of the one or more blocks identified in the CBL.

9. A structured storage system having a processor and memory that facilitates the seamless integration of one or more Binary Large Objects (Blobs), the structured storage system comprising:
   a processor;
   computer readable media;
   a primary structured index embodied on the computer readable media, the primary structured index indexes one or more Blobs in a structured storage system, the primary structured storage index has at least a memory table and a row store, wherein the row store includes at least an update log stream and a file checkpoint stream, wherein the structured storage system comprises a sequence number allocator, wherein the sequence number allocator generates sequence numbers that are assigned to structured storage system; and further wherein the sequence number allocator maintains an indication of a last acknowledged sequence, which is the highest sequence number completed, further wherein, during replay of a Blob log stream, transaction with a sequence number less than the last acknowledged sequence are allowed to replay from the Blob log stream; and
   a secondary hash index embodied on the computer readable media, the secondary hash index is a compressed hash index of the primary structured index, wherein the secondary hash index facilitates in-memory lookup of one or more Blobs indexed in the primary structured index prior to searching the primary structured index for the one or more Blobs.

10. The structured storage system of claim 9, wherein the memory table is checkpointed in preparation of an offload of an associated partition.

11. The structured storage system of claim 10, wherein the secondary hash index is checkpointed in preparation of an offload of an associated partition.

12. The structured storage system of claim 9, wherein the secondary hash index is maintained consistent with the primary structured index by loading of the secondary hash index from a last checkpoint and utilizing at least one of:
   1) a file table and the memory table, and
   2) a hash index delta log and memory table changes.

13. The structured storage system of claim 9 further comprising a Blob store, wherein the Blob store allows for multiple Blob properties per row of the Blob store, further wherein a key is associated with each Blob property of the Blob store, the key is comprised of a primary row key associated with the row of the Blob property and a Blob property name associated with the Blob property.

* * * * *